United States Patent
Tomayko

(10) Patent No.: US 9,604,354 B2
(45) Date of Patent: Mar. 28, 2017

(54) TOOL HAVING MULTI-SPEED COMPOUND PLANETARY TRANSMISSION

(71) Applicant: BLACK & DECKER INC., New Britain, CT (US)

(72) Inventor: David C. Tomayko, Ellicott City, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 14/955,098

(22) Filed: Dec. 1, 2015

(65) Prior Publication Data

US 2016/0082580 A1 Mar. 24, 2016

Related U.S. Application Data

(63) Continuation of application No. 13/406,134, filed on Feb. 27, 2012, now Pat. No. 9,233,461.

(51) Int. Cl.
*B25F 5/00* (2006.01)
*B25B 21/00* (2006.01)
(Continued)

(52) U.S. Cl.
CPC ............... *B25F 5/001* (2013.01); *B25B 21/00* (2013.01); *B25B 23/14* (2013.01); *F16H 3/66* (2013.01); *F16H 2200/0039* (2013.01)

(58) Field of Classification Search
CPC .... B25F 5/00; B25F 5/001; B25F 5/02; B25B 21/00; B25B 23/14; B25B 23/141; F16H 3/64; F16H 3/66
(Continued)

(56) References Cited

U.S. PATENT DOCUMENTS

| 3,872,742 A | 3/1975 | States |
| 4,185,520 A | 1/1980 | Henneman et al. |

(Continued)

FOREIGN PATENT DOCUMENTS

| DE | 3736413 A1 | 5/1989 |
| DE | 9016415 U1 | 7/1991 |

(Continued)

OTHER PUBLICATIONS

Gavaza, Bogdan, Primary Examiner—Communication Pursuant to Article 94(3) EPC—Nov. 28, 2016—4 pages—Netherlands.

*Primary Examiner* — Scott A. Smith
(74) *Attorney, Agent, or Firm* — Scott B. Markow

(57) ABSTRACT

A tool having a housing assembly, which defines a handle, a motor assembly, a trigger assembly, a spindle and a transmission assembly. The motor assembly is received in the housing assembly and has an output shaft. The trigger assembly is coupled to the housing assembly and is configured for use in actuating the motor assembly. The transmission assembly transmits rotary power between the output shaft of the motor assembly and the spindle. The transmission assembly includes a planetary stage with an input sun gear, an output planet carrier and a compound planet gear having a first planet gear and a second planet gear coupled together for common rotation on the output planet carrier. The planetary stage is selectively operable in a first gear reduction and a second, relatively lower gear reduction in which the compound planet gear cooperates to produce at least one intermediate gear reduction within the planetary stage.

20 Claims, 17 Drawing Sheets

(51) Int. Cl.
*B25B 23/14* (2006.01)
*F16H 3/66* (2006.01)

(58) Field of Classification Search
USPC .... 173/47, 48, 216, 217, 178; 475/290, 317, 475/286, 263, 293, 298
See application file for complete search history.

(56) References Cited

U.S. PATENT DOCUMENTS

| | | | |
|---|---|---|---|
| 4,418,766 A | 12/1983 | Grossmann | |
| 4,493,223 A | 1/1985 | Kishi et al. | |
| 4,791,833 A | 12/1988 | Sakai et al. | |
| 4,892,013 A | 1/1990 | Satoh | |
| 5,011,463 A | 4/1991 | Jarchow et al. | |
| 5,458,206 A | 10/1995 | Bourner et al. | |
| 5,550,416 A * | 8/1996 | Fanchang | E21B 3/02 173/216 |
| 5,692,575 A | 12/1997 | Hellstrom | |
| 5,704,433 A | 1/1998 | Bourner et al. | |
| 5,897,454 A * | 4/1999 | Cannaliato | F16H 61/0293 475/263 |
| 5,967,934 A | 10/1999 | Ishida et al. | |
| 6,070,675 A | 6/2000 | Mayer et al. | |
| 6,086,502 A * | 7/2000 | Chung | B25F 5/001 475/299 |
| 6,142,242 A * | 11/2000 | Okumura | B25B 23/141 173/216 |
| 6,213,224 B1 | 4/2001 | Furuta et al. | |
| 6,305,481 B1 | 10/2001 | Yamazaki et al. | |
| 6,431,289 B1 | 8/2002 | Potter et al. | |
| 6,435,285 B1 | 8/2002 | Tsai | |
| RE37,905 E | 11/2002 | Bourner et al. | |
| 6,502,648 B2 | 1/2003 | Milbourne | |
| 6,599,219 B2 | 7/2003 | Pan | |
| 6,655,470 B1 | 12/2003 | Chen | |
| 6,676,557 B2 | 1/2004 | Milbourne et al. | |
| 6,796,921 B1 | 9/2004 | Buck et al. | |
| 6,805,207 B2 | 10/2004 | Hagan et al. | |
| 6,857,983 B2 | 2/2005 | Milbourne et al. | |
| 6,892,827 B2 * | 5/2005 | Toyama | B25D 16/003 173/178 |
| 6,939,262 B1 * | 9/2005 | Yu | B25F 5/001 475/207 |
| 6,983,810 B2 | 1/2006 | Hara et al. | |
| 6,984,188 B2 | 1/2006 | Potter et al. | |
| 7,044,882 B2 * | 5/2006 | Eisenhardt | B25F 5/001 475/298 |
| 7,101,300 B2 | 9/2006 | Milbourne et al. | |
| 7,121,361 B2 | 10/2006 | Hara et al. | |
| 7,198,586 B2 | 4/2007 | Brooks et al. | |
| 7,220,210 B2 | 5/2007 | Soh | |
| 7,220,211 B2 | 5/2007 | Potter et al. | |
| 7,223,195 B2 | 5/2007 | Milbourne et al. | |
| 7,225,884 B2 * | 6/2007 | Aeberhard | B25B 21/00 173/205 |
| 7,288,041 B2 | 10/2007 | Bucknor et al. | |
| 7,300,374 B2 | 11/2007 | Bucknor et al. | |
| 7,314,097 B2 | 1/2008 | Jenner et al. | |
| 7,334,646 B2 | 2/2008 | Hara et al. | |
| 7,354,375 B2 | 4/2008 | Brooks et al. | |
| 7,404,781 B2 | 7/2008 | Milbourne et al. | |
| 7,407,460 B2 | 8/2008 | Eisenhardt | |
| 7,410,441 B2 | 8/2008 | Milbourne et al. | |
| 7,452,304 B2 | 11/2008 | Hagan et al. | |
| 7,537,064 B2 | 5/2009 | Milbourne et al. | |
| 7,900,714 B2 | 3/2011 | Milbourne et al. | |
| 8,251,158 B2 * | 8/2012 | Tomayko | B23B 45/008 173/11 |
| 9,233,461 B2 * | 1/2016 | Tomayko | B25F 5/001 |
| 2003/0143042 A1 | 7/2003 | Doyle et al. | |
| 2005/0028997 A1 | 2/2005 | Hagan et al. | |
| 2005/0061524 A1 | 3/2005 | Hagan et al. | |
| 2005/0077063 A1 | 4/2005 | Oretti | |
| 2005/0215385 A1 | 9/2005 | Spielmann et al. | |
| 2006/0211534 A1 | 9/2006 | Roberts et al. | |
| 2007/0084614 A1 | 4/2007 | Whitmire et al. | |
| 2007/0201748 A1 | 8/2007 | Bixler et al. | |
| 2008/0173459 A1 | 7/2008 | Kuroyanagi et al. | |
| 2008/0220925 A1 | 9/2008 | Schwingshandl | |
| 2008/0287247 A1 | 11/2008 | Pusateri | |
| 2009/0071671 A1 | 3/2009 | Zhong et al. | |
| 2009/0071673 A1 | 3/2009 | Zhong et al. | |
| 2009/0173510 A1 | 7/2009 | Milbourne et al. | |
| 2009/0242226 A1 | 10/2009 | Tokunaga | |
| 2010/0163261 A1 * | 7/2010 | Tomayko | B23B 45/008 173/47 |
| 2010/0200257 A1 | 8/2010 | Scrimshaw et al. | |
| 2011/0036605 A1 | 2/2011 | Leong et al. | |
| 2011/0162861 A1 | 7/2011 | Borinato et al. | |
| 2011/0186320 A1 | 8/2011 | Ito | |
| 2011/0214891 A1 | 9/2011 | Roehm | |
| 2011/0220377 A1 | 9/2011 | Roehm | |
| 2011/0220379 A1 | 9/2011 | Bixler et al. | |
| 2011/0220380 A1 | 9/2011 | Roehm | |
| 2011/0275471 A1 | 11/2011 | Roehm et al. | |
| 2012/0006574 A1 | 1/2012 | Atsumi et al. | |
| 2012/0010043 A1 | 1/2012 | Inagaki et al. | |
| 2012/0028753 A1 | 2/2012 | Atsumi et al. | |
| 2012/0040793 A1 | 2/2012 | Hashimoto | |
| 2012/0088620 A1 | 4/2012 | Saur | |
| 2012/0222878 A1 | 9/2012 | Bixler et al. | |
| 2012/0222879 A1 | 9/2012 | Bixler et al. | |

FOREIGN PATENT DOCUMENTS

| | | |
|---|---|---|
| DE | 29820723 U1 | 2/1999 |
| DE | 20304314 U1 | 7/2003 |
| DE | 202004006236 U1 | 7/2004 |
| DE | 202009011705 U1 | 12/2009 |
| DE | 202011106465 U1 | 2/2012 |
| EP | 0404035 A1 | 8/1994 |
| EP | 0926057 A2 | 6/1999 |
| EP | 1382421 A3 | 3/2004 |
| EP | 1815948 A2 | 8/2007 |
| EP | 1886768 A1 | 2/2008 |
| EP | 1886769 B1 | 2/2009 |
| EP | 2095909 A1 | 9/2009 |
| EP | 2184138 A | 5/2010 |
| EP | 2368670 A2 | 9/2011 |
| EP | 2394797 A2 | 12/2011 |
| EP | 2404710 A2 | 1/2012 |
| EP | 2161477 B1 | 8/2012 |
| JP | 2004160592 A | 6/2004 |
| JP | 2009125909 A | 6/2009 |
| JP | 2009125910 A | 6/2009 |
| WO | WO-2009024165 A1 | 2/2009 |
| WO | WO-2009027821 A3 | 6/2009 |
| WO | WO-2010048889 A1 | 5/2010 |
| WO | WO-2010134431 A1 | 11/2010 |
| WO | WO-2011085871 A1 | 7/2011 |
| WO | WO-2011135076 A1 | 11/2011 |
| WO | WO-2012038255 A1 | 3/2012 |
| WO | WO-2012093010 A1 | 7/2012 |

* cited by examiner

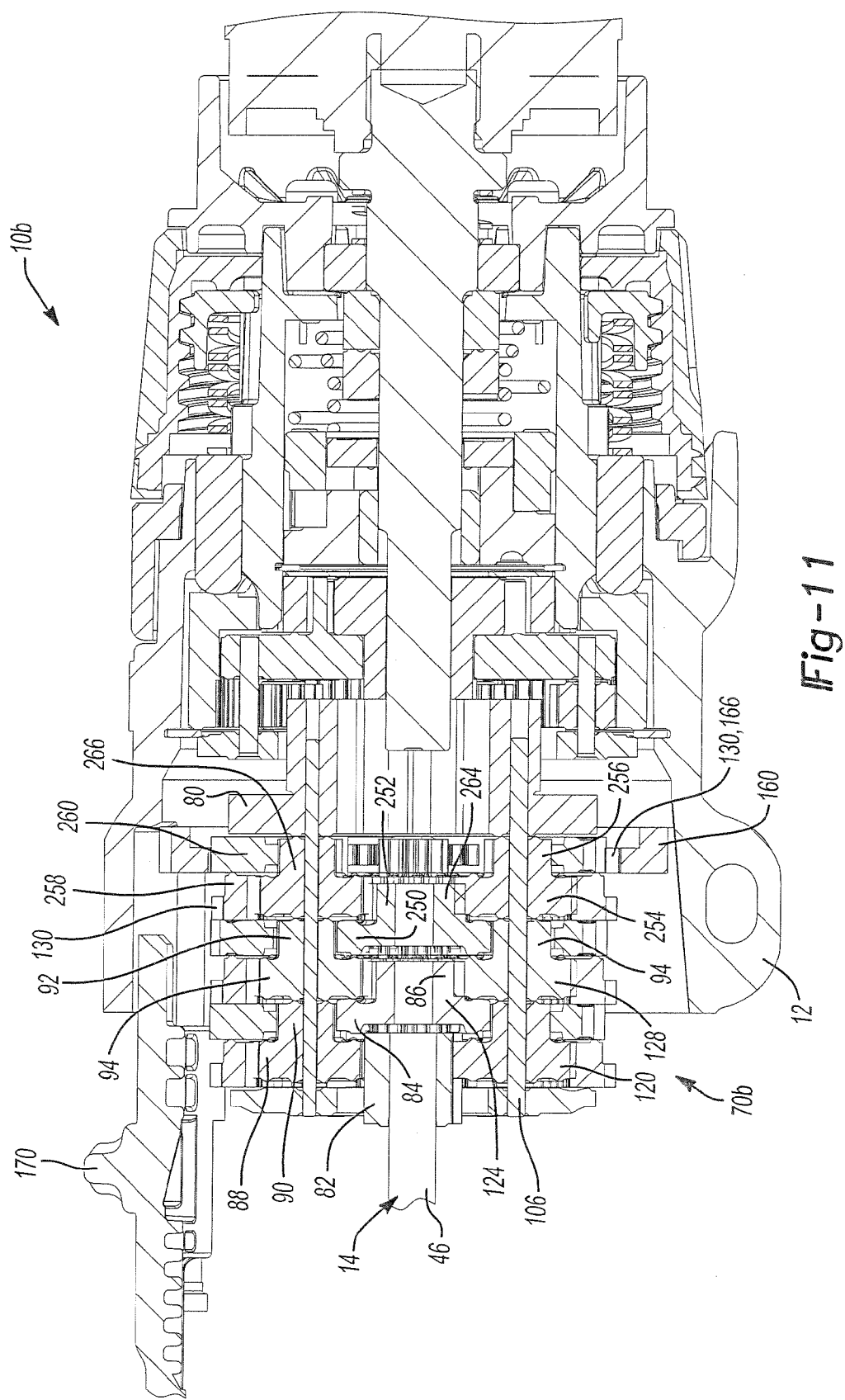

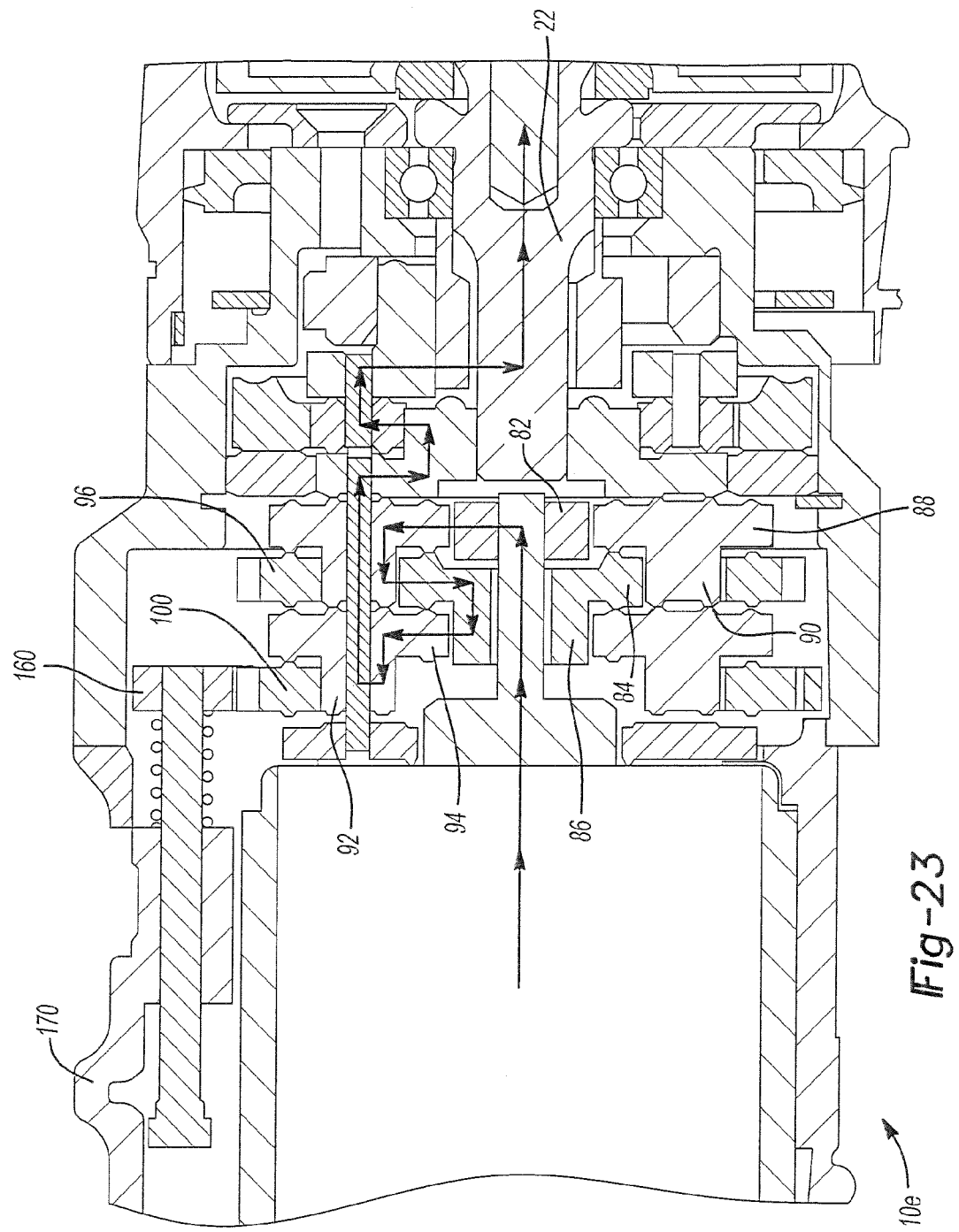

TOOL HAVING MULTI-SPEED COMPOUND PLANETARY TRANSMISSION

CROSS REFERENCE TO RELATED APPLICATION

This application is a continuation of U.S. patent application Ser. No. 13/406,134, filed Feb. 27, 2012, now U.S. Pat. No. 9,233,461, which is incorporated by reference.

INTRODUCTION

The present invention generally relates to a tool that has a multi-speed compound planetary transmission.

Modernly, manufacturers of power tools have introduced power tools that have variable speed motors in an attempt to permit the users of these tools with sufficient control over the output speed of the tool so as to permit them to perform diverse operations without resort to additional, specialized tools. Many of the tools that are commercially available include a three-stage, two-speed transmission that permits even greater control over speeds of these tools.

Typically available transmission arrangements have lacked a transmission arrangement that could produce a wide range of output speeds and torques that would permit the tool to perform diverse operations such as drilling holes with a large diameter hole saw, installing drywall screws or large diameter lag screws, and performing high-speed drilling operations. The single or dual speed transmissions that were generally employed in these tools typically did not have sufficient speed reducing capacity to permit these transmissions to be diversely employed as configuring these tools for high torque operations tended to impair their high speed performance. Furthermore, the rechargeable batteries that were employed in many of the early cordless rotary power tools were not well suited for use in low-speed, high torque operations due to the amount of energy that is consumed and the rate with which the energy is consumed by the power tool during such operations. Consequently, consumers were often forced to purchase two different rotary power tools, a medium-duty tool for "standard" applications such as drilling and fastening, and a heavy-duty tool having a low-speed, high torque output for more demanding tasks.

With the advent of the modern high capacity, high voltage battery, it is now possible to meet the energy demands of a power tool that is used in low-speed, high torque operations. There remains, however, a need in the art for a power tool transmission having a relatively large range in its speed reducing capacity.

SUMMARY

This section provides a general summary of some aspects of the present disclosure and is not a comprehensive listing or detailing of either the full scope of the disclosure or all of the features described therein.

The present teachings provide a tool having a housing assembly, a motor assembly, a trigger assembly, a spindle and a transmission assembly. The housing assembly defines a handle. The motor assembly is received in the housing assembly and has an output shaft. The trigger assembly is coupled to the housing assembly and is configured for use in actuating the motor assembly. The transmission assembly transmits rotary power between the output shaft of the motor assembly and the spindle.

In one form, the present teachings provide that the transmission assembly includes a planetary stage with an input sun gear, an output planet carrier and a compound planet gear having a first planet gear and a second planet gear coupled together for common rotation on the output planet carrier. The planetary stage is selectively operable in a first gear reduction and a second, relatively lower gear reduction in which the compound planet gear cooperates to produce at least one intermediate gear reduction within the planetary stage.

In another form, the present teachings provide that the transmission assembly includes a gearset portion with a planet carrier, an input sun gear, and at least one compound planet gear supported for rotation by the planet carrier. The planet carrier is an output member of the gearset portion. Each compound planet gear has first and second planet gears that are coupled to one another for common rotation. The first planet gear has a pitch diameter that is different from a pitch diameter of the second planet gear. The gearset portion is operable in a first mode which provides a first gear reduction ratio and a second mode that provides a second gear reduction ratio that is different than the first gear reduction ratio. At least one intermediate gear reduction is provided within an axial length of the planet carrier when the gearset portion is operated in the second mode.

In still another form, the present teachings provide that the transmission assembly includes a gearset portion with a planet carrier, an input sun gear, a compound sun gear, a first planet gear, a second planet gear, a third planet gear, and a plurality of ring gears. The compound sun gear includes a first intermediate sun gear and a second intermediate sun gear that are coupled to one another for common rotation. The first, second and third planet gears are rotatably disposed on the planet carrier. The second planet gear is coupled to the first planet gear for rotation therewith. The first planet gear is meshingly engaged with the input sun gear. The second planet gear is meshingly engaged with the first intermediate sun gear. The third planet gear is meshingly engaged with the second intermediate sun gear. The plurality of ring gears include a first ring gear, which is meshingly engaged to one of the first, second and third planet gears, and a second ring gear that is meshingly engaged to a different one of the first, second and third planet gears. The gearset portion is operable in a first mode in which the first ring gear is maintained in a non-rotating condition relative to the housing assembly and the second ring gear is rotatable relative to the housing assembly. The gearset portion is operable in a second mode in which the second ring gear is maintained in a non-rotating condition relative to the housing assembly and the first ring gear is rotatable relative to the housing assembly.

In yet another form, the present teachings provide that the transmission assembly includes a planetary stage with an input sun gear, an output planet carrier and a compound planet gear having a first planet gear and a second planet gear coupled together for common rotation on the output planet carrier. The planetary stage is selectively operable in a first gear reduction and a second, relatively lower gear reduction in which the compound planet gear cooperates to produce at least one intermediate gear reduction within the planetary stage.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various FIGS.

FIG. 11 is a longitudinal section view of a portion of another exemplary tool constructed in accordance with the teachings of the present disclosure;

FIG. 23 is a longitudinal section view of a portion of another exemplary tool constructed in accordance with the teachings of the present disclosure.

Corresponding reference numerals indicate corresponding parts throughout the several views of the drawings.

DETAILED DESCRIPTION OF THE VARIOUS EMBODIMENTS

Figure 1:
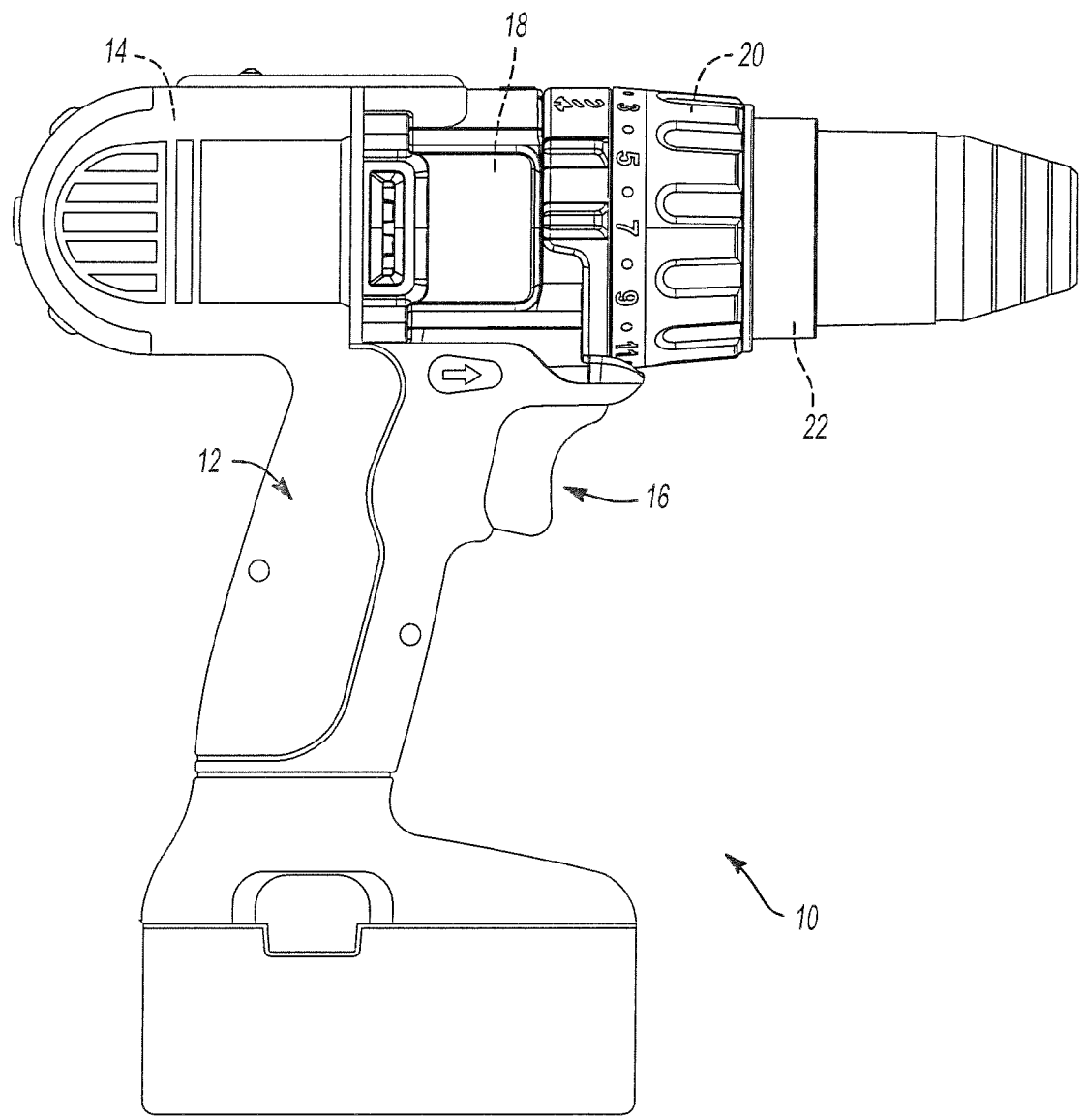
FIG. 1 is a side elevation view of an exemplary tool constructed in accordance with the teachings of the present disclosure.
Figure 2:
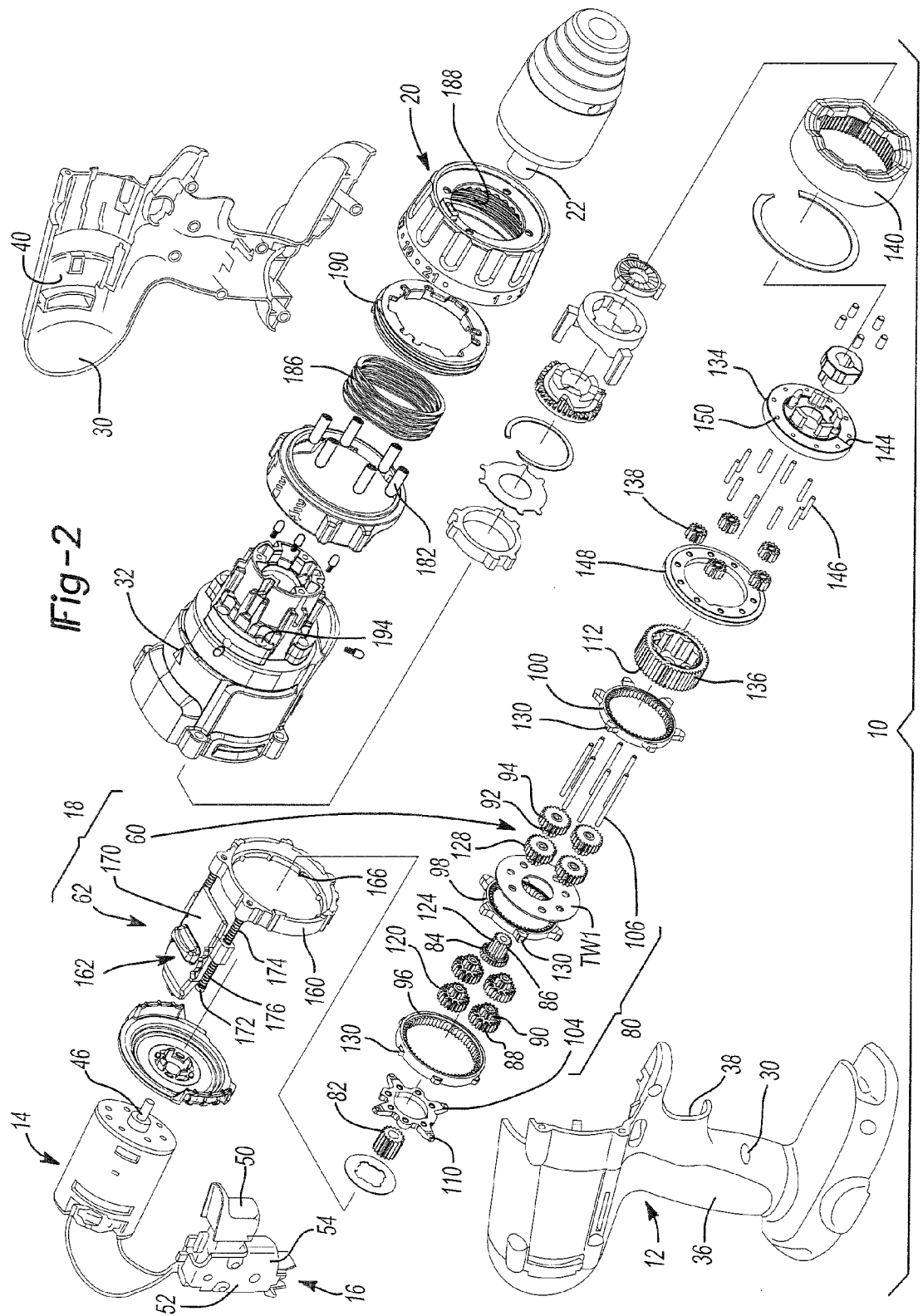
FIG. 2 is an exploded perspective view of the tool of FIG. 1.

With reference to FIGS. 1 and 2, an exemplary tool constructed in accordance with the teachings of the present disclosure is generally indicated by reference numeral 10. The tool 10 can include a housing assembly 12, a motor assembly 14, a trigger assembly 16, a transmission assembly 18, a clutch assembly 20 and an output spindle 22.

The housing assembly 12 can comprise a pair of handle housing shells 30 and a gear case 32 that can be removably coupled to the handle housing shells 30 via a plurality of threaded fasteners (not shown). The handle housing shells 30 can cooperate to define a handle 36, a trigger mount 38, and a cavity 40 into which the motor assembly 14 can be received.

The motor assembly 14 and the trigger assembly 16 can be conventional in their construction and operation. In brief, the motor assembly 14 can include an output shaft 46 that can provide a rotary input (torque) to the transmission assembly 18, while the trigger assembly 16 can be mounted to the trigger mount 38 and employed to selectively couple the motor assembly 14 to a source of electrical power, such as a battery pack 48. In the example provided, the trigger assembly 16 includes a trigger 50, a trigger switch 52, and a reversible variable speed controller 54, but it will be appreciated that various other types of trigger assemblies could be substituted for the particular trigger assembly that is shown in the drawings and described herein.

The transmission assembly 18 can be configured to transmit rotary power between the motor assembly 14 and the output spindle 22 and can include a reduction gearset 60 and a speed change mechanism 62.

Figure 3:
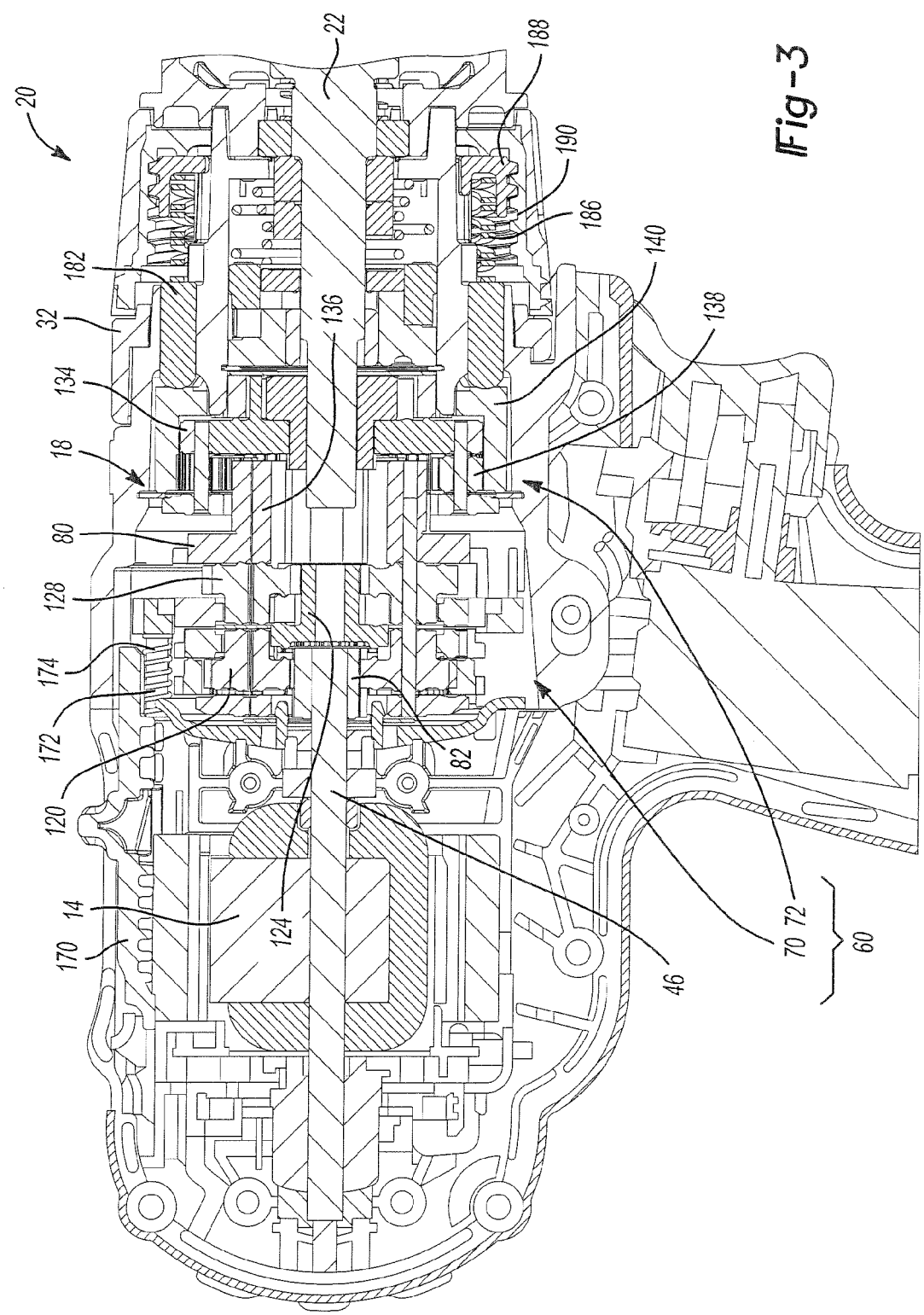
FIG. 3 is a longitudinal section view of a portion of the tool of FIG. 1.
Figure 4:
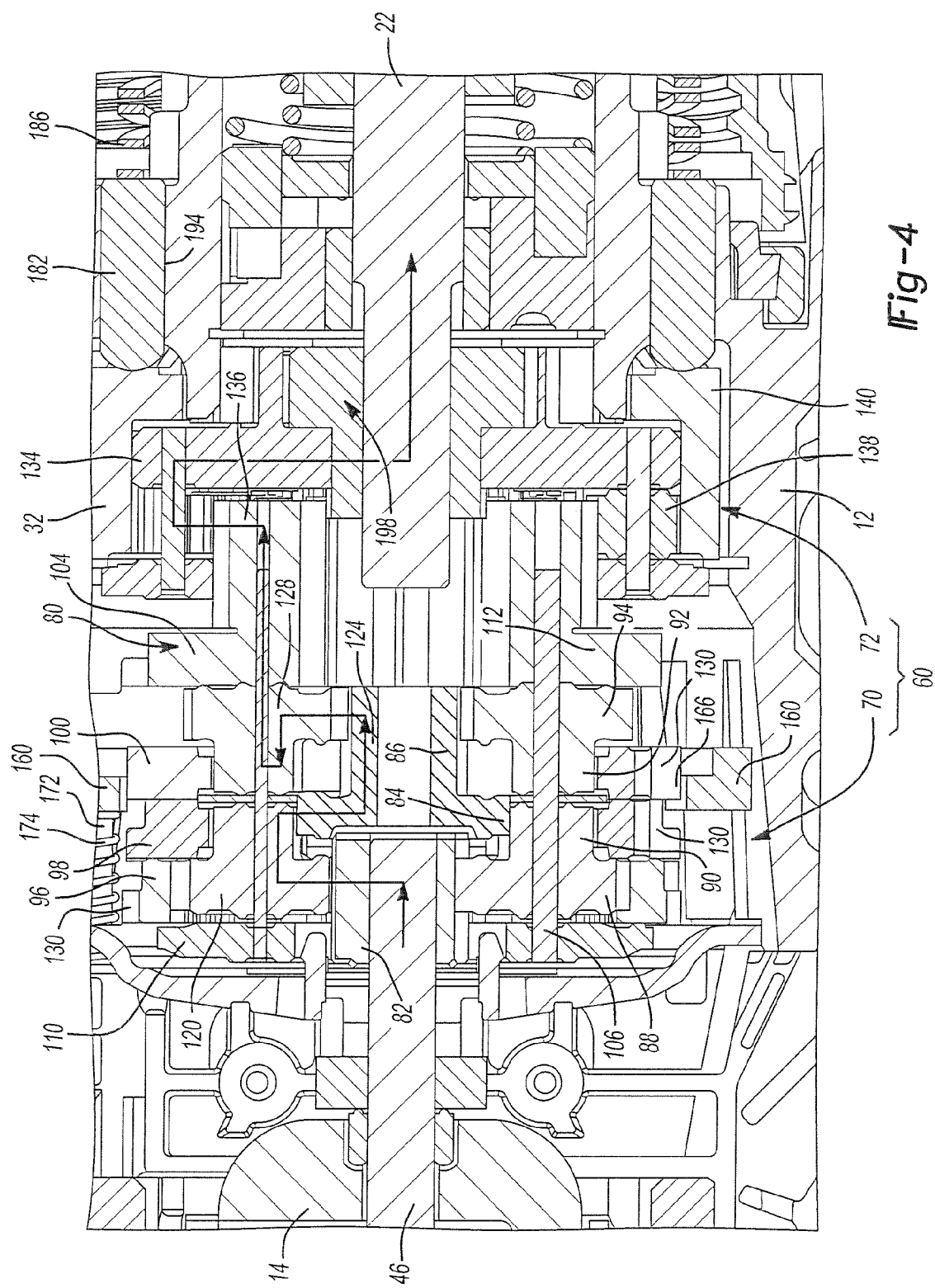
FIG. 4 is an enlarged portion of FIG. 3, illustrating a first gearset portion operating in a fourth mode.

With reference to FIGS. 2 through 4, the reduction gearset 60 can comprise a first planetary stage or gearset portion 70, which receives rotary power from the motor assembly 14, and a second planetary stage or gearset portion 72 that receives rotary power from the first gearset portion 70 and transmits rotary power to the output spindle 22.

The first gearset portion 70 can comprise a first or output planet carrier 80, a first or input sun gear 82, a second sun gear 84, a third sun gear 86, a first planet gear 88, a second planet gear 90, a third planet gear 92, a fourth planet gear 94, a first ring gear 96, a second ring gear 98, and a third ring gear 100.

The first planet carrier 80 can comprise a carrier body 104 and a plurality of carrier pins 106. In the example provided, the carrier body 104 comprises a rear plate member 110 and a front plate member 112, and the opposite ends of the carrier pins 106 can be fixedly mounted to the rear and front plate members 110 and 112 to axially space the rear plate member 110 apart from the front plate member 112. The first, second, third and fourth planet gears 88, 90, 92 and 94 can be rotatably mounted on the carrier pins 106. In the example provided, one of each of the first, second, third and fourth planet gears 88, 90, 92 and 94 is rotatably received on each of the carrier pins 106.

The first sun gear 82 can be coupled to the output shaft 46 of the motor assembly 14 for rotation therewith. Teeth of the first sun gear 82 can be meshingly engaged to teeth of the first planet gear 88, which in turn can mesh with teeth of the first ring gear 96. The second sun gear 84 can be rotatable independently of the output shaft 46, the first sun gear 82 and/or the first planet carrier 80. In the example provided, the second sun gear 84 is separate and axially offset from the first sun gear 82 and is maintained in a position that is concentric about a longitudinal axis of the first gearset portion 70 via the second planet gears 90. It will be appreciated, however, that the output shaft 46 could be somewhat longer than that which is shown in FIGS. 2-4 and that the second sun gear 84 could be rotatably disposed on the output shaft 46. It will also be appreciated that another structure, such as the first sun gear 82 or the planet carrier 80, could include a shaft onto which the second sun gear 84 and/or the third sun gear 86 could be rotatably disposed. Teeth of the second sun gear 84 can be meshingly engaged to teeth of the second planet gear 90, which in turn can mesh with teeth of the second ring gear 98. Each of the second planet gears 90 can be coupled to an associated one of the first planet gears 88 for common rotation about an associated one of the carrier pins 106. In the example provided, each pair of first and second planet gears 88 and 90 are unitarily and integrally formed (e.g., compressed and sintered powdered metal) and may be collectively referred to as a first compound planet gear 120. The third sun gear 86 can be coupled to the second sun gear 84 for common rotation. In the particular example provided, the second and third sun gears 84 and 86 are unitarily and integrally formed (e.g., compressed and sintered powdered metal) and may be collectively referred to as a first compound sun gear 124. Teeth of the third sun gear 86 can be meshingly engaged to teeth of the fourth planet gear 94. Each of the third planet gears 92 can be coupled to an associated one of the fourth planet gears 94 for common rotation about an associated one of the carrier pins 106. In the example provided, each pair of third and fourth planet gears 92 and 94 are unitarily and integrally formed (e.g., compressed and sintered powdered metal) and may be collectively referred to as a second compound planet gear 128. Teeth of the third planet gears 92 can meshingly engage teeth of the third ring gear 100. If desired, a thrust washer TW1 can be disposed between the first and second compound gears 120 and 128.

Each of the first, second and third ring gears 96, 98 and 100 can have a plurality of locking teeth 130 that can be disposed about their outer circumferential surfaces.

The second gearset portion 72 can comprise a planet carrier 134, a sun gear 136, a plurality of planet gears 138 and a ring gear 140. The planet carrier 134 can comprise a carrier body 144 and a plurality of carrier pins 146. The carrier body 144 can comprise a rear plate member 148 and a front plate member 150, and the opposite ends of the carrier pins 146 can be fixedly mounted to the rear and front plate members 148 and 150 to axially space the rear plate member 148 apart from the front plate member 150. Each of the planet gears 138 can be rotatably received on an associated one of the carrier pins 146 and can be meshingly engaged with teeth of the sun gear 136 and teeth of the ring gear 140. The ring gear 140 can be rotatably received in the gear case 32.

The speed change mechanism 62 can comprise a movable member 160 and a speed selector switch assembly 162. In the example provided, the movable member 160 is an annular collar that is mounted concentrically about the first gearset portion 70 and which has internal teeth 166 that are configured to engage the locking teeth 130 on the first, second and third ring gears 96, 98 and 100. The speed selector switch assembly 162 can comprise a speed selector switch 170, one or more rails 172, a first biasing spring 174, a second biasing spring 176. The speed selector switch 170 can be slidably mounted to the housing assembly 12 and can be configured to receive a manual switching input from the user of the tool 10. The speed selector switch 170 can be translated between a first switch position, a second switch position and a third switch position in the particular example provided. The rails 172 can be fixedly coupled to the movable member 160 and slidably coupled to the speed selector switch 170 such that the movable member 160 can translate relative to the speed selector switch 170 and the first gearset portion 70. The first and second biasing springs 174 and 176 can bias the movable member 160 into a neutral position that corresponds to a position of the speed selector switch 170. The first and second biasing springs 174 and 176, however, permit the movable member 160 to be moved relative to the speed selector switch 170 in opposite axial directions.

Placement of the speed selector switch 170 in the first switch position positions the movable member 160 in a first position in which the internal teeth 166 of the movable member 160 are engaged with the locking teeth 130 of the first ring gear 96 such that the first gearset portion 70 operates in the first mode (i.e., a first overall speed reduction ratio). Movement of the speed selector switch 170 from the first switch position to the second switch position positions the movable member 160 in a second position in which the internal teeth 166 of the movable member 160 are engaged with the locking teeth 130 of the second ring gear 98 such that the first gearset portion 70 operates in the second mode (i.e., a second overall speed reduction ratio). Movement of the speed selector switch 170 from the second switch position to the third switch position positions the movable member 160 in a third position in which the internal teeth 166 of the movable member 160 are engaged with the locking teeth 130 of the third ring gear 100 such that the first gearset portion 70 operates in the third mode (i.e., a third overall speed reduction ratio).

If the internal teeth 166 of the movable member 160 are not aligned with the locking teeth of the second ring gear 98 or third ring gear 100 when the speed selector switch 170 is moved from the first switch position to the second switch position or from the second switch position to the third switch position, the first biasing spring 174 can compress to permit the speed selector switch 170 to move relative to the movable member 160. Similarly, if the internal teeth 166 of the movable member 160 are not aligned with the locking teeth of the second ring gear 98 or the first ring gear 96 when the speed selector switch is moved from the third switch position to the second switch position or from the second switch position to the first switch position, the second biasing spring 176 can compress to permit the speed selector switch 170 to move relative to the movable member 160. In this way, the user may complete the movement of the speed selector switch 170 (to a desired switch position) and the first and second biasing springs 174 and 176 can exert a force onto the movable member 160 to axially translate the movable member 160 (to thereby change the mode in which the first gearset portion 70 operates) when the internal teeth 166 are in alignment with the locking teeth 130 on the associated one of the first, second and third ring gears 96, 98 and 100.

The clutch assembly 20 can be a conventional clutch assembly that can be configured to limit the transmission of torque from the transmission assembly 18 to the output spindle 22. In the particular example provided, the clutch assembly 20 comprises a plurality of clutch pins 182, a clutch spring 186 and an adjustment nut 188 that is threadably mounted to a threaded member 190 that is non-rotatably but axially slidably mounted to the gear case 32. Each of the clutch pins 182 can be received through a corresponding pin hole 194 in the gear case 32. The clutch pins 182 can abut the ring gear 140 and can abut the clutch spring 186 on a side opposite the ring gear 140. The clutch spring 186 can be compressed between the clutch pins 182 and the adjustment nut 188 and can apply a force to the clutch pins 182 that resists rotation of the ring gear 140. The adjustment nut 188 is threaded to the threaded member 190 on the clutch housing 180 to permit the force that is exerted by the clutch spring 186 onto the clutch pins 182 to be selectively adjusted.

The output spindle 22 can be coupled to the planet carrier 134 for rotation therewith, but in the particular example provided, a conventional spindle lock assembly 198 is disposed between the planet carrier 134. As those of ordinary skill in the art will appreciate, the spindle lock assembly 198 is configured to permit the planet carrier 134 to drive the output spindle 22 and to inhibit rotation of the output spindle 22 that would tend to drive the planet carrier 134.

With reference to FIG. 4, positioning of the speed selector switch 170 (FIG. 3) in the third switch position positions the movable member 160 in engagement with the third ring gear 100 such that the third ring gear 100 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88 due to the meshing engagement of the teeth of the first planet gears 88 with the teeth of the input sun gear 82. As the second planet gears 90 are coupled to the first planet gears 88 for common rotation and as the teeth of the second planet gears 90 are meshingly engaged to the teeth of the second sun gear 84, rotation of the second planet gears 90 causes corresponding rotation of the second sun gear 84. It will be appreciated that since the pitch diameter of the second planet gears 90 is smaller than the pitch diameter of the first planet gears 88, and since the pitch diameter of the second sun gear 84 is larger than the pitch diameter of the first sun gear 82, the first compound planet gear 120 cooperates to produce a first intermediate gear reduction within the first gearset portion 70. Since the third sun gear 86 is coupled to the second sun gear for common rotation, and since the teeth of the fourth planet gears 94 are meshed with the teeth of the third sun gear 86, rotation of the second sun gear 84 causes corresponding rotation of the fourth planet gears 94. It will be appreciated that since the pitch diameter of the third sun gear 86 is smaller than the pitch diameter of the second sun gear 84, and since the pitch diameter of the fourth planet gears 94 is larger than the pitch diameter of the second planet gears 90, the first compound sun gear 124 cooperates to produce a second intermediate gear reduction within the first gearset portion 70. It will be further appreciated that because the third planet gears 92 are coupled to the fourth planet gears 94 for common rotation, the third planet gears 92 will drive the planet carrier 80 such that the first gearset portion 70 operates in fourth overall speed reduction ratio. It will be appreciated that any ring gears in the first gearset portion 70 that are non-rotatably coupled to the housing assembly 12 (i.e., via the movable member 160) are rotatable relative to the housing assembly 12. Accordingly, the first and second ring gears 96 and 98 are rotatable relative to the housing assembly 12 in this mode of operation.

Figure 5:
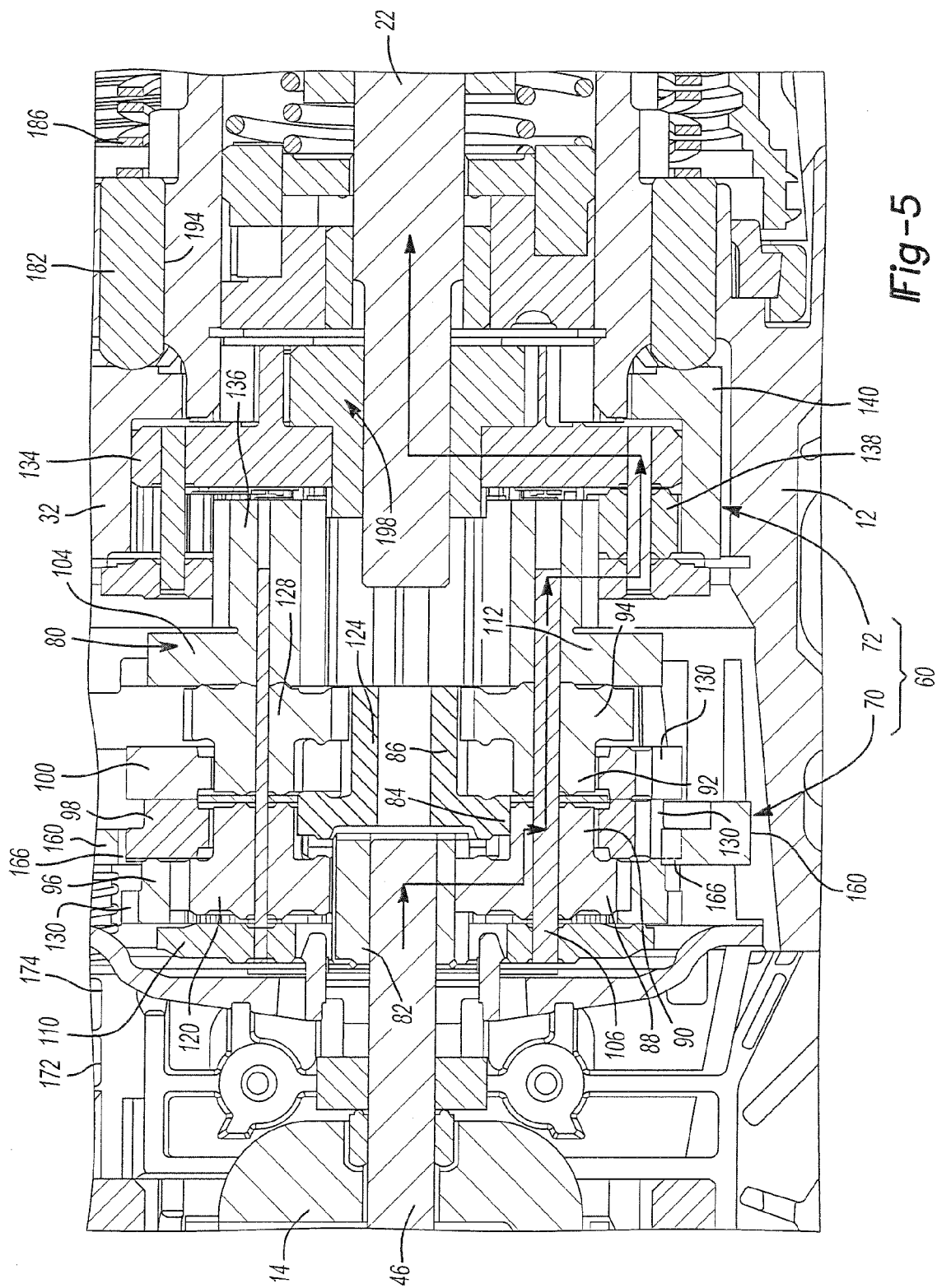
FIG. 5 is a view similar to that of FIG. 4 but depicting the first gearset portion operating in a second mode.

With reference to FIG. 5, positioning of the speed selector switch 170 (FIG. 3) in the second switch position positions the movable member 160 in engagement with the second ring gear 98 such that the second ring gear 98 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88 due to the meshing engagement of the teeth of the first planet gears 88 with the teeth of the input sun gear 82. The second planet gears 90, which rotate with the first planet gears 88, will drive the planet carrier 80 such that the first gearset portion 70 operates in second overall speed reduction ratio. It will be appreciated, however, that rotation of the second planet gears 90 will also cause corresponding rotation of the first compound sun gear 124 and the second compound planet gear 128. Since the third ring gear 100 is permitted to rotate relative to the housing assembly 12, rotation of the first compound sun gear 124 and the second compound planet gear 128 will have only a minor effect on the efficiency of the first gearset portion 70.

Figure 6:
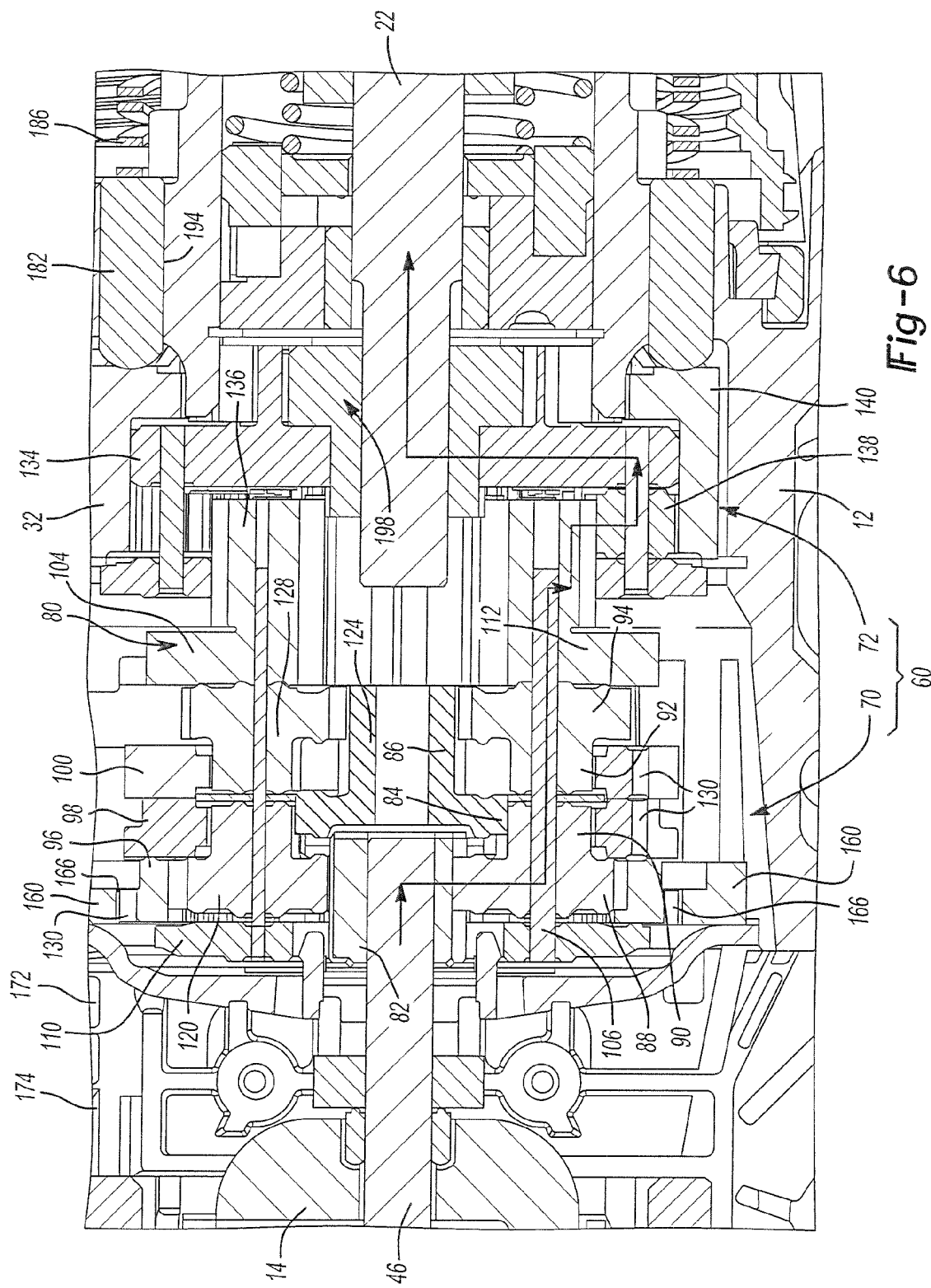
FIG. 6 is a view similar to that of FIG. 4 but depicting the first gearset portion operating in a first mode.

With reference to FIG. 6, positioning of the speed selector switch 170 (FIG. 3) in the first switch position positions the movable member 160 in engagement with the first ring gear 96 such that the first ring gear 96 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88, which drives the planet carrier 80 such that the first gearset portion 70 operates in a first overall speed reduction ratio. Rotation of the first planet gears 88 will cause corresponding rotation of the second planet gears 90 and that rotation of the second planet gears 90 will also cause corresponding rotation of the first compound sun gear 124 and the second compound planet gear 128. Since the second and third ring gears 98 and 100 are permitted to rotate relative to the housing assembly 12, rotation of the second planet gear 90, the first compound sun gear 124 and the second compound planet gear 128 will have only a minor effect on the efficiency of the first gearset portion 70.

It will be appreciated that in all modes other than the first mode (in which the first planet gears 88 drive the planet carrier 80 such that the first gearset portion 70 operates in a first overall speed reduction ratio, the first gearset portion 70 operates such that at least one intermediate gear reduction is provided between the input sun gear 82 and the planet gears that drive the planet carrier 80 (i.e., the planet gears that are meshed with the ring gear that is non-rotatably coupled to the housing assembly 12) to thereby provide the first gearset portion 70 with an overall gear reduction ratio that is lower than the overall gear reduction ratio when the first gearset portion 70 is operated in the first mode.

Figure 7:
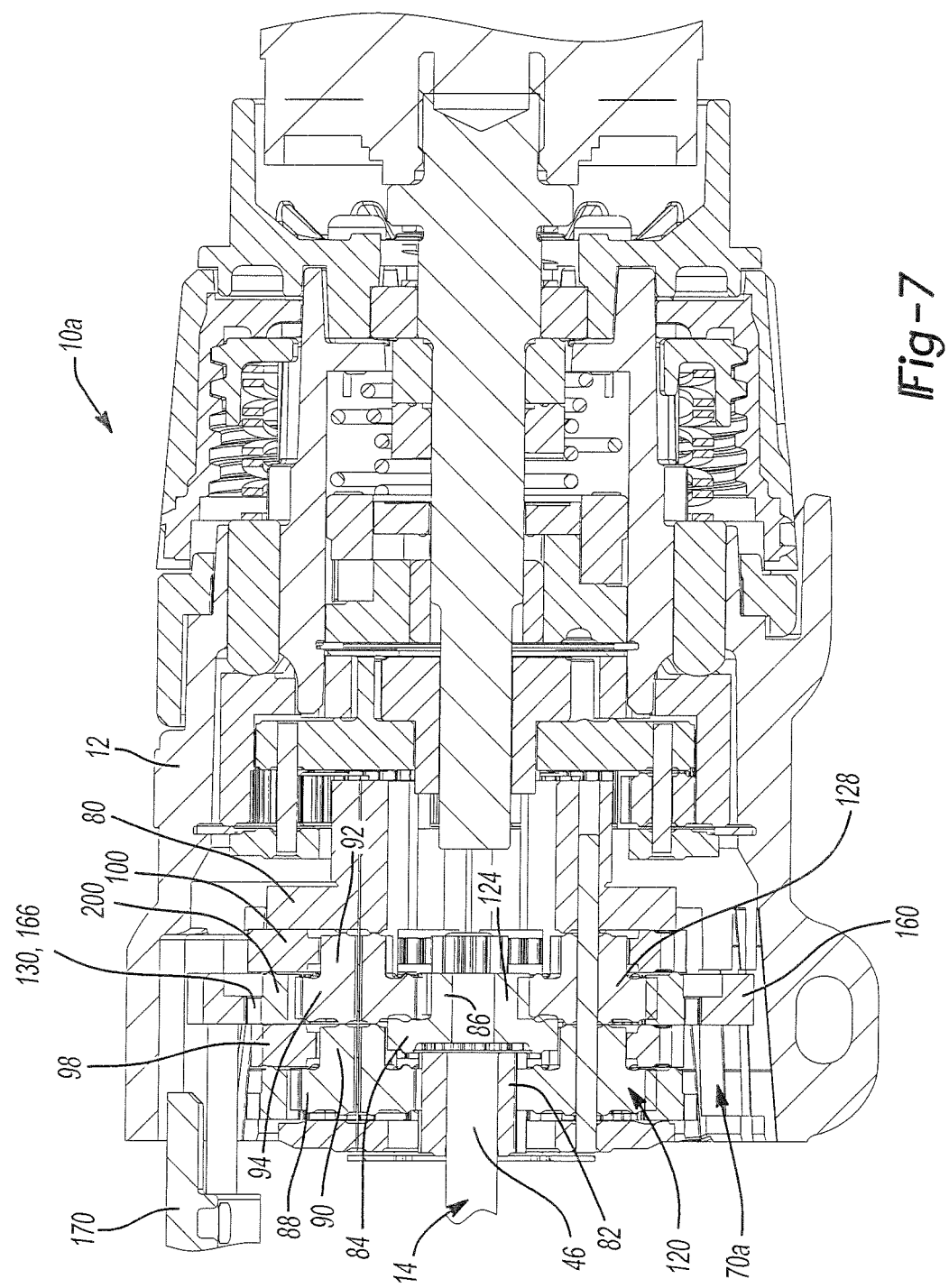
FIG. 7 is a longitudinal section view of a portion of another exemplary tool constructed in accordance with the teachings of the present disclosure.
Figure 8:
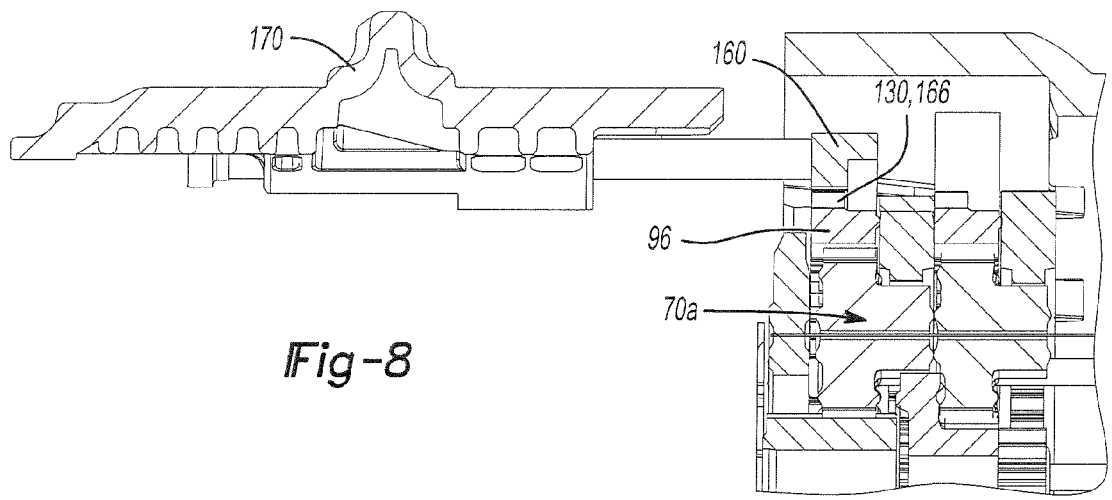
FIGS. 8, 9 and 10 are longitudinal section views of a portion of the tool of FIG. 7, depicting a gearset portion of the tool as operating in first, second and fourth modes, respectively.
Figure 9:
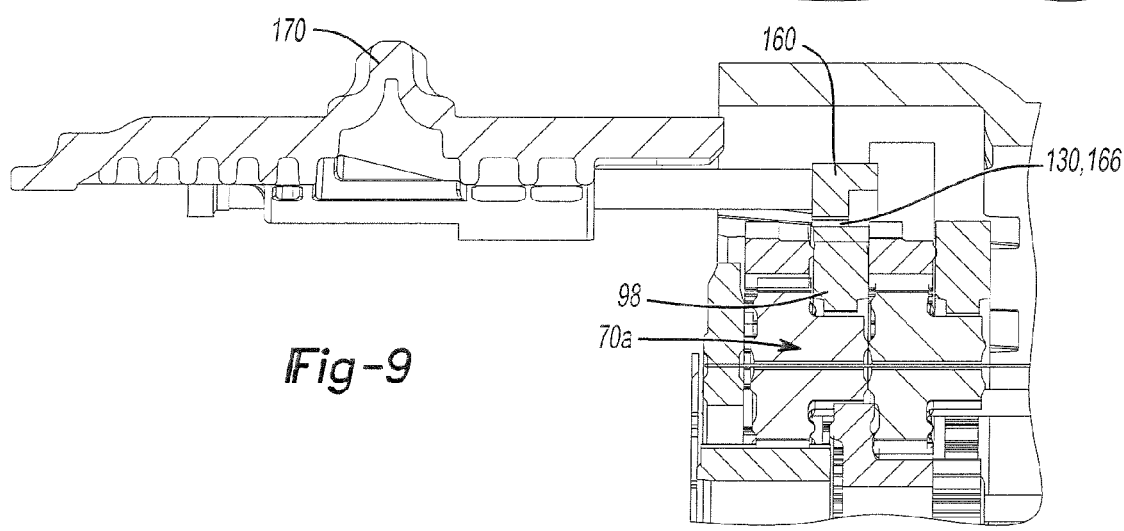
Figure 10:
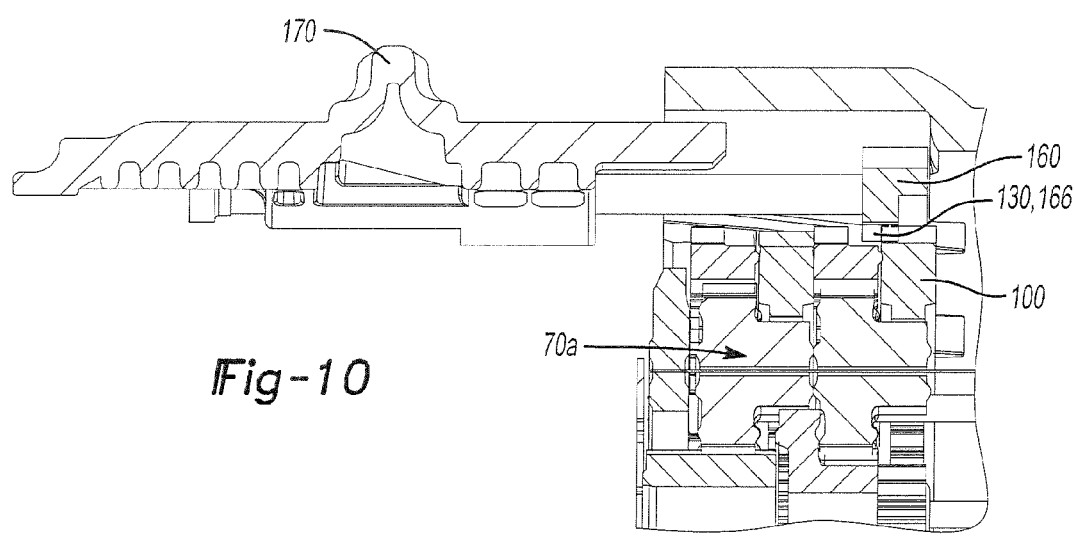

With reference to FIG. 7, another tool constructed in accordance with the teachings of the present disclosure is generally indicated by reference numeral 10a. The tool 10a can be generally similar to the tool 10 of FIG. 1, except that the first gearset portion 70a additionally comprises a fourth ring gear 200 that is disposed between the second and third ring gears 98 and 100, the second compound planet gear 128 is flipped in a front-to-back direction and the speed selector switch 170 is movable into a fourth switch position to cause the tool 10a to operate in a fourth mode (i.e., a fourth overall speed reduction ratio). The fourth ring gear 200 has teeth that are meshed with the teeth of the fourth planet gears 94 and like the first, second and third ring gears 96, 98 and 100, locking teeth 130 are formed about the outer circumferential surface of the fourth ring gear 200. The speed selector switch 170 may be positioned in the first, second or third switch positions as is shown in FIGS. 8, 9 and 10, respectively, and the tool 10a will operate as described above with the only difference being that the fourth ring gear 200 is rotatable relative to the housing assembly 12 when the first gearset portion 70a is operated in these modes. Positioning of the speed selector switch 170 in the fourth switch position as shown in FIG. 7 positions the movable member 160 in engagement with the fourth ring gear 200 such that the fourth ring gear 200 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88 due to the meshing engagement of the teeth of the first planet gears 88 with the teeth of the input sun gear 82. As the second planet gears 90 are coupled to the first planet gears 88 for common rotation and as the teeth of the second planet gears 90 are meshingly engaged to the teeth of the second sun gear 84, rotation of the second planet gears 90 causes corresponding rotation of the second sun gear 84. It will be appreciated that since the pitch diameter of the second planet gears 90 is smaller than the pitch diameter of the first planet gears 88, and since the pitch diameter of the second sun gear 84 is larger than the pitch diameter of the first sun gear 82, the first compound planet gear 120 cooperates to produce a first intermediate gear reduction within the first gearset portion 70a. Since the third sun gear 86 is coupled to the second sun gear 84 for common rotation, and since the teeth of the fourth planet gears 94 are meshed with the teeth of the third sun gear 86, rotation of the second sun gear 84 causes corresponding rotation of the fourth planet gears 94. It will be appreciated that since the pitch diameter of the third sun gear 86 is smaller than the pitch diameter of the second sun gear 84, and since the pitch diameter of the fourth planet gears 94 is larger than the pitch diameter of the second planet gears 90, the first compound sun gear 124 cooperates to produce a second intermediate gear reduction within the first gearset portion 70a. The fourth planet gears 92 will drive the planet carrier 80 such that the first gearset portion 70a operates in a fourth overall speed reduction ratio that is intermediate the second and third overall speed reduction ratios.

In FIG. 11, another tool constructed in accordance with the teachings of the present disclosure is generally indicated by reference numeral 10b. The tool 10b is generally similar to the tool 10a of FIG. 7, except that the first gearset portion 70b further comprises a fourth sun gear 250, a fifth sun gear 252, a fifth planet gear 254, a sixth planet gear 256, a fifth ring gear 258 and a sixth ring gear 260, and the speed selector switch 170 is movable into fifth and sixth switch position to cause the tool 10b to operate in fifth and sixth modes, respectively. The fourth sun gear 250 can be axially spaced apart from the third sun gear 86 such that it is not directly coupled to the output shaft 46, the first sun gear 82, the first compound sun gear 124 or the first planet carrier 80. Teeth of the fourth sun gear 250 can be meshingly engaged to teeth of the third planet gears 92. The fourth sun gear 250 can be coupled to the fifth sun gear 252 for common rotation. In the particular example provided, the fourth and fifth sun gears 250 and 252 are unitarily and integrally formed (e.g., compressed and sintered powdered metal) and may be collectively referred to as a second compound sun gear 264. Teeth of the fifth sun gear 252 can be meshingly engaged to teeth of the fifth planet gear 254, which can be meshed with teeth of the fifth ring gear 258. Each of the fifth planet gears 254 can be coupled to an associated one of the sixth planet gears 256 for common rotation about an associated one of the carrier pins 106. In the example provided, each pair of fifth and sixth planet gears 254 and 256 are unitarily and integrally formed (e.g., compressed and sintered powdered metal) and may be collectively referred to as a third compound planet gear 266. Teeth of the sixth planet gears 256 can meshingly engage teeth of the sixth ring gear 260.

Figure 12:
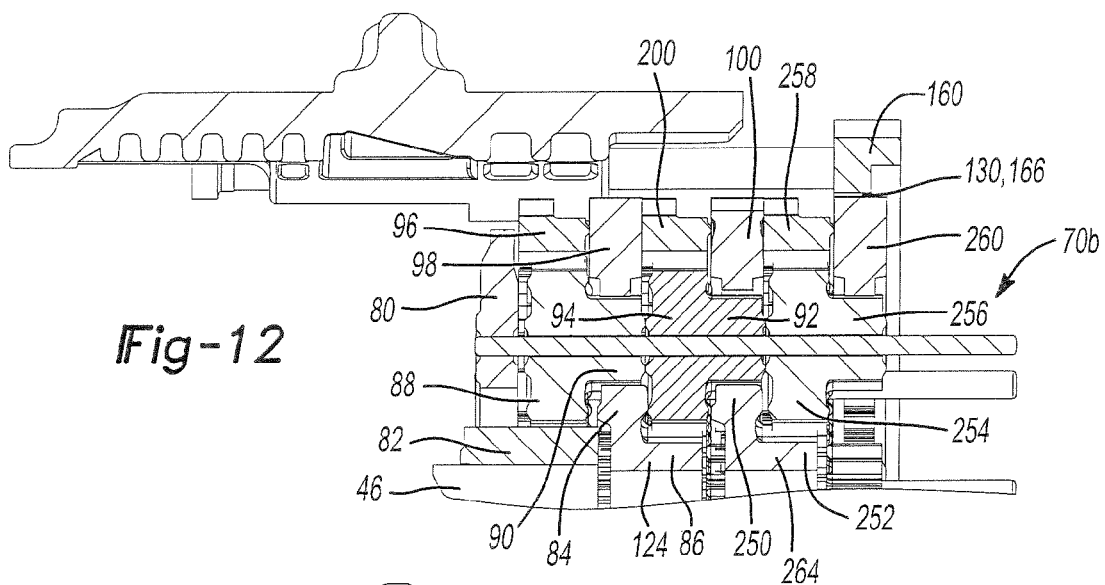
FIGS. 12, 13, 14, 15, 16 and 17 are longitudinal section views of a portion of the tool of FIG. 11, depicting a gearset portion of the tool as operating in sixth, fifth, fourth, third, second and first modes, respectively.

Positioning of the speed selector switch 170 in the sixth switch position positions the movable member 160 in engagement with the sixth ring gear 260 (as shown in FIG. 12) such that the sixth ring gear 260 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88 due to the meshing engagement of the teeth of the first planet gears 88 with the teeth of the input sun gear 82. As the second planet gears 90 are coupled to the first planet gears 88 for common rotation and as the teeth of the second planet gears 90 are meshingly engaged to the teeth of the second sun gear 84, rotation of the second planet gears 90 causes corresponding rotation of the second sun gear 84. It will be appreciated that since the pitch diameter of the second planet gears 90 is smaller than the pitch diameter of the first planet gears 88, and since the pitch diameter of the second sun gear 84 is larger than the pitch diameter of the first sun gear 82, the first compound planet gear 120 cooperates to produce a first intermediate gear reduction within the first gearset portion 70b. Since the third sun gear 86 is coupled to the second sun gear for common rotation, and since the teeth of the fourth planet gears 94 are meshed with the teeth of the third sun gear 86, rotation of the second sun gear 84 causes corresponding rotation of the third planet gears 92. It will be appreciated that since the pitch diameter of the third sun gear 86 is smaller than the pitch diameter of the second sun gear 84, and since the pitch diameter of the fourth planet gears 94 is larger than the pitch diameter of the second planet gears 90, the first compound sun gear 124 cooperates to produce a second intermediate gear reduction within the first gearset portion 70b. As the third planet gears 92 are coupled to the fourth planet gears 94 for common rotation and as the teeth of the third planet gears 92 are meshingly engaged to the teeth of the fourth sun gear 250, rotation of the third planet gears 92 causes corresponding rotation of the fourth sun gear 250. It will be appreciated that since the pitch diameter of the third planet gears 92 is smaller than the pitch diameter of the third planet gears 92, and since the pitch diameter of the fourth sun gear 250 is larger than the pitch diameter of the third sun gear 86, the second compound planet gear 128 cooperates to produce a third intermediate gear reduction within the first gearset portion 70b. Since the fifth sun gear 252 is coupled to the fourth sun gear for common rotation, and since the teeth of the fifth planet gears 254 are meshed with the teeth of the fifth sun gear 252, rotation of the fourth sun gear 250 causes corresponding rotation of the fifth planet gears 254. It will be appreciated that since the pitch diameter of the fifth sun gear 252 is smaller than the pitch diameter of the fourth sun gear 250, and since the pitch diameter of the fifth planet gears 254 is larger than the pitch diameter of the third planet gears 92, the second compound sun gear 264 cooperates to produce a fourth intermediate gear reduction within the first gearset portion 70b. Because the sixth planet gears 256 are coupled to the fifth planet gears 254 for common rotation, the sixth planet gears 256 will drive the planet carrier 80 such that the first gearset portion 70b operates in sixth overall speed reduction ratio.

Figure 13:
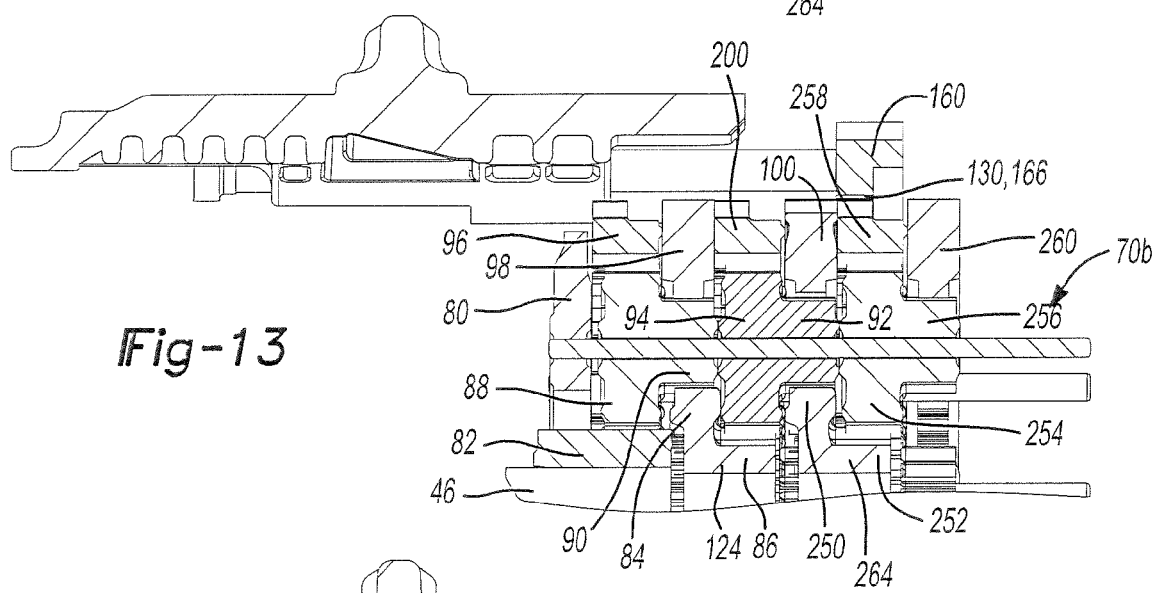

Positioning of the speed selector switch 170 in the fifth switch position positions the movable member 160 in engagement with the fifth ring gear 258 (as shown in FIG. 13) such that the fifth ring gear 258 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88 due to the meshing engagement of the teeth of the first planet gears 88 with the teeth of the input sun gear 82. As the second planet gears 90 are coupled to the first planet gears 88 for common rotation and as the teeth of the second planet gears 90 are meshingly engaged to the teeth of the second sun gear 84, rotation of the second planet gears 90 causes corresponding rotation of the second sun gear 84. It will be appreciated that since the pitch diameter of the second planet gears 90 is smaller than the pitch diameter of the first planet gears 88, and since the pitch diameter of the second sun gear 84 is larger than the pitch diameter of the first sun gear 82, the first compound planet gear 120 cooperates to produce a first intermediate gear reduction within the first gearset portion 70b. Since the third sun gear 86 is coupled to the second sun gear for common rotation, and since the teeth of the fourth planet gears 94 are meshed with the teeth of the third sun gear 86, rotation of the second sun gear 84 causes corresponding rotation of the fourth planet gears 94. It will be appreciated that since the pitch diameter of the third sun gear 86 is smaller than the pitch diameter of the second sun gear 84, and since the pitch diameter of the fourth planet gears 94 is larger than the pitch diameter of the second planet gears 90, the first compound sun gear 124 cooperates to produce a second intermediate gear reduction within the first gearset portion 70b. As the third planet gears 92 are coupled to the fourth planet gears 94 for common rotation and as the teeth of the third planet gears 92 are meshingly engaged to the teeth of the fourth sun gear 250, rotation of the third planet gears 92 causes corresponding rotation of the fourth sun gear 250. It will be appreciated that since the pitch diameter of the third planet gears 92 is smaller than the pitch diameter of the fourth planet gears 94, and since the pitch diameter of the fourth sun gear 250 is larger than the pitch diameter of the third sun gear 86, the second compound planet gear 128 cooperates to produce a third intermediate gear reduction within the first gearset portion 70b. Since the fifth sun gear 252 is coupled to the fourth sun gear for common rotation, and since the teeth of the fifth planet gears 254 are meshed with the teeth of the fifth sun gear 252, rotation of the fourth sun gear 250 causes corresponding rotation of the fifth planet gears 254. Rotation of the fifth planet gears 254 drives the planet carrier 80 such that the first gearset portion 70b operates in fifth overall speed reduction ratio.

Figure 14:
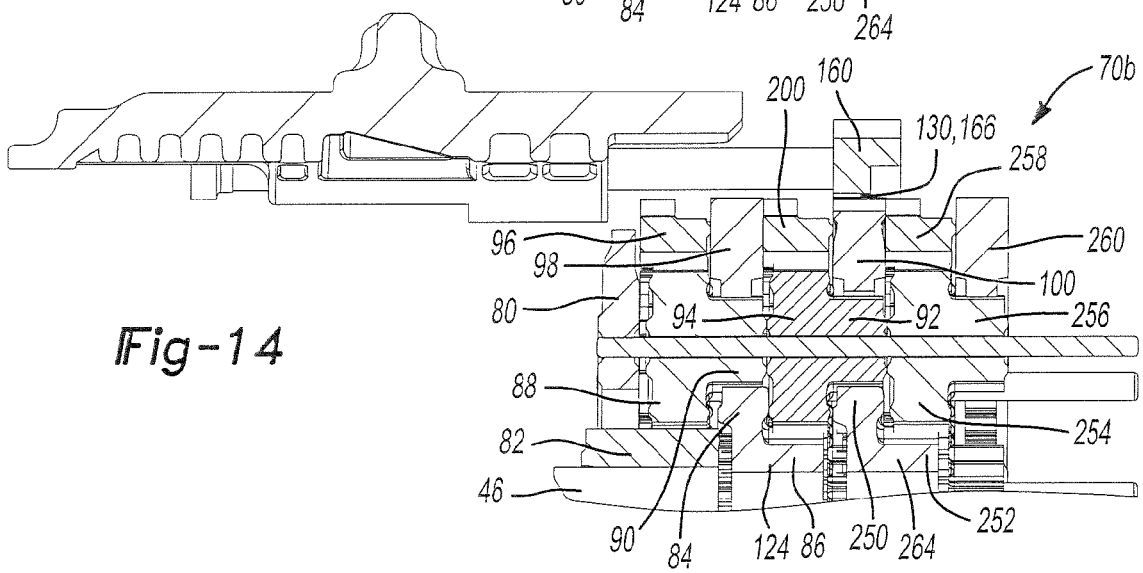

Positioning of the speed selector switch 170 in a fourth switch position positions the movable member 160 in engagement with the third ring gear 100 (as shown in FIG. 14) such that the third ring gear 100 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88 due to the meshing engagement of the teeth of the first planet gears 88 with the teeth of the input sun gear 82. As the second planet gears 90 are coupled to the first planet gears 88 for common rotation and as the teeth of the second planet gears 90 are meshingly engaged to the teeth of the second sun gear 84, rotation of the second planet gears 90 causes corresponding rotation of the second sun gear 84. It will be appreciated that since the pitch diameter of the second planet gears 90 is smaller than the pitch diameter of the first planet gears 88, and since the pitch diameter of the second sun gear 84 is larger than the pitch diameter of the first sun gear 82, the first compound planet gear 120 cooperates to produce a first intermediate gear reduction within the first gearset portion 70b. Since the third sun gear 86 is coupled to the second sun gear for common rotation, and since the teeth of the third planet gears 92 are meshed with the teeth of the third sun gear 86, rotation of the second sun gear 84 causes corresponding rotation of the fourth planet gears 94. It will be appreciated that since the pitch diameter of the third sun gear 86 is smaller than the pitch diameter of the second sun gear 84, and since the pitch diameter of the fourth planet gears 94 is larger than the pitch diameter of the second planet gears 90, the first compound sun gear 124 cooperates to produce a second intermediate gear reduction within the first gearset portion 70b. As the third planet gears 92 are coupled to the fourth planet gears 94 for common rotation, the third planet gears 92 drive the planet carrier 80 such that the first gearset portion 70b operates in a fourth overall speed reduction ratio.

Figure 15:
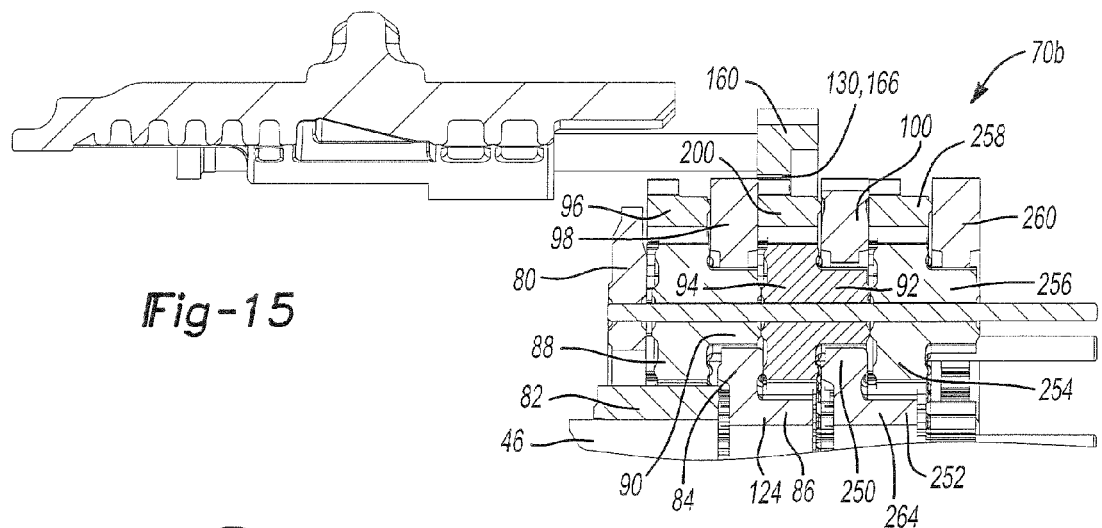

Positioning of the speed selector switch 170 in a third switch position positions the movable member 160 in engagement with the fourth ring gear 200 (as shown in FIG. 15) such that the fourth ring gear 200 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88 due to the meshing engagement of the teeth of the first planet gears 88 with the teeth of the input sun gear 82. As the second planet gears 90 are coupled to the first planet gears 88 for common rotation and as the teeth of the second planet gears 90 are meshingly engaged to the teeth of the second sun gear 84, rotation of the second planet gears 90 causes corresponding rotation of the second sun gear 84. It will be appreciated that since the pitch diameter of the second planet gears 90 is smaller than the pitch diameter of the first planet gears 88, and since the pitch diameter of the second sun gear 84 is larger than the pitch diameter of the first sun gear 82, the first compound planet gear 120 cooperates to produce a first intermediate gear reduction within the first gearset portion 70b. Since the third sun gear 86 is coupled to the second sun gear for common rotation, and since the teeth of the fourth planet gears 94 are meshed with the teeth of the third sun gear 86, rotation of the second sun gear 84 causes corresponding rotation of the fourth planet gears 94, which drive the planet carrier 80 such that the first gearset portion 70b operates in a third overall speed reduction ratio.

Figure 16:
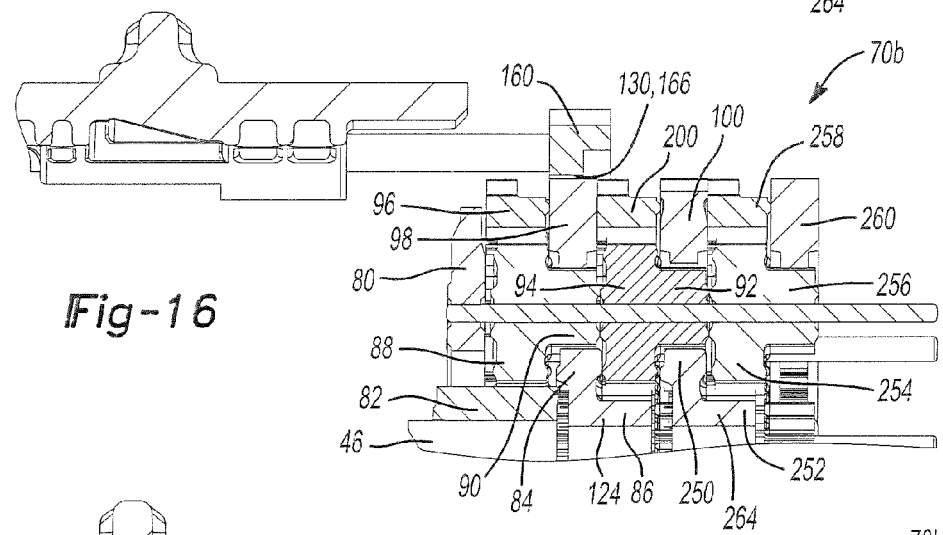

Positioning of the speed selector switch 170 in the second switch position positions the movable member 160 in engagement with the second ring gear 98 (as shown in FIG. 16) such that the second ring gear 98 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88 due to the meshing engagement of the teeth of the first planet gears 88 with the teeth of the input sun gear 82. As the second planet gears 90 are coupled to the first planet gears 88 for common rotation, rotation of the second planet gears 90 drives the planet carrier 80 such that the first gearset portion 70b operates in a second overall speed reduction ratio.

Figure 17:
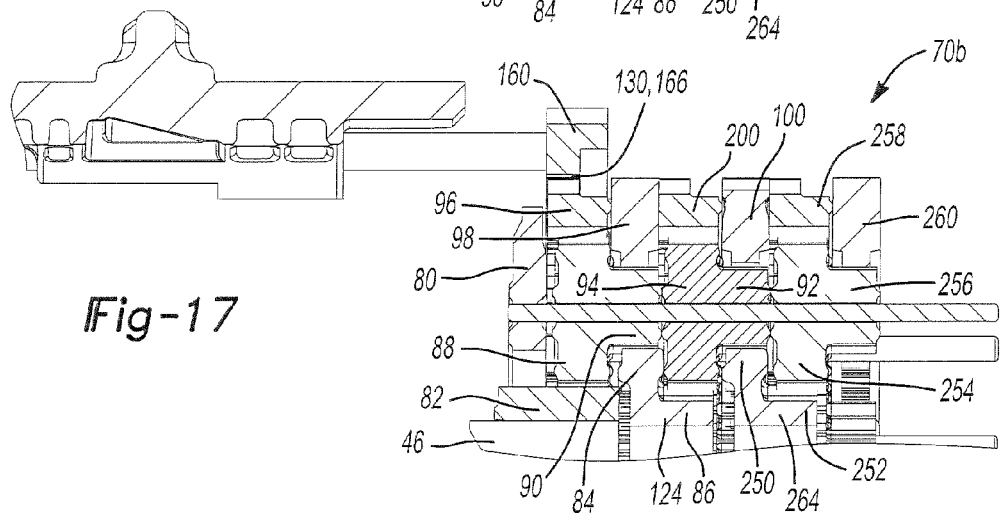

Positioning of the speed selector switch 170 in the first switch position positions the movable member 160 in engagement with the first ring gear 96 (as shown in FIG. 17) such that the first ring gear 96 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88, which drive the planet carrier 80 such that the first gearset portion 70b operates in a first overall speed reduction ratio.

Figure 11A:
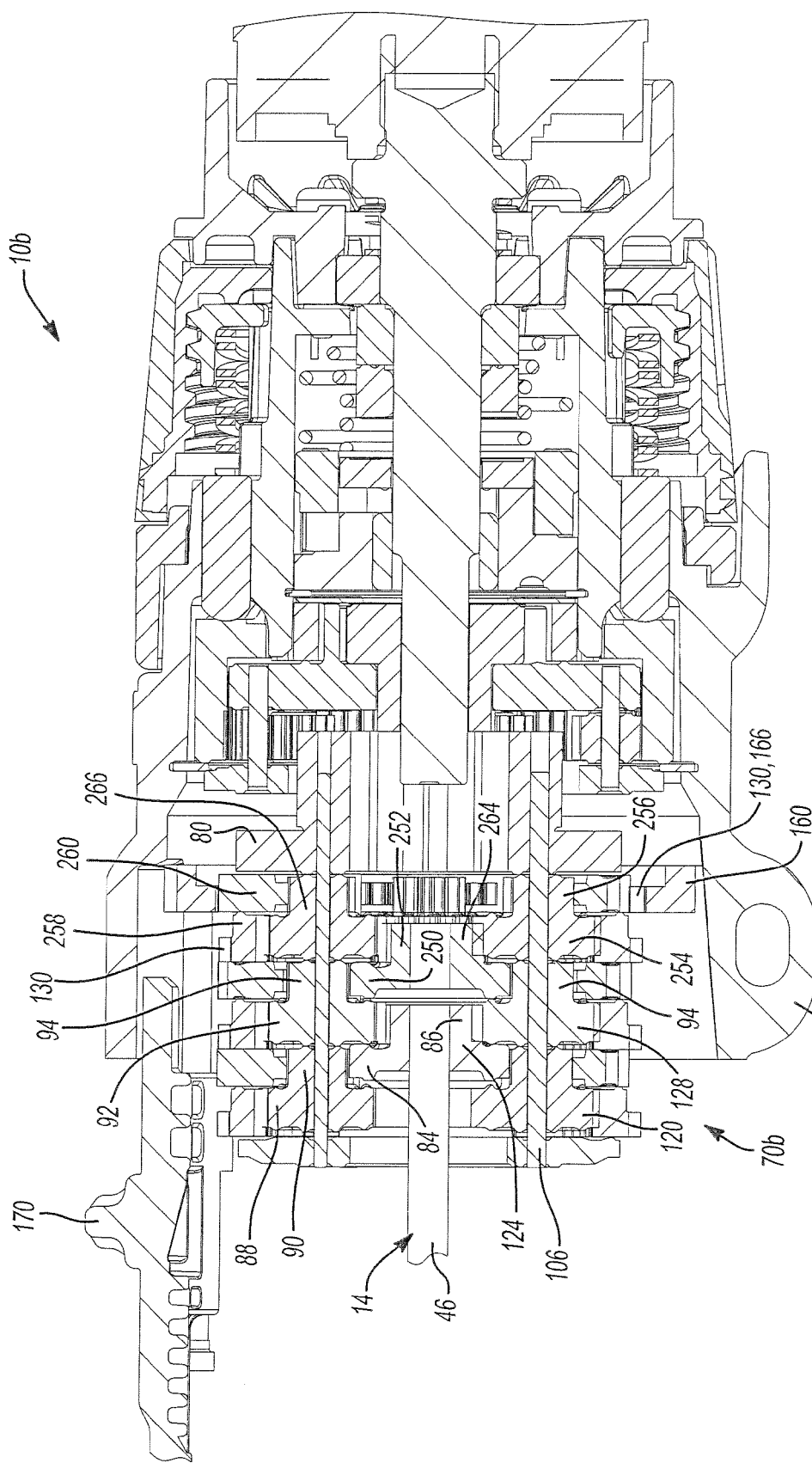
FIG. 11A is a longitudinal section view of a portion of a further exemplary tool constructed in accordance with the teachings of the present disclosure.
Figure 11B:
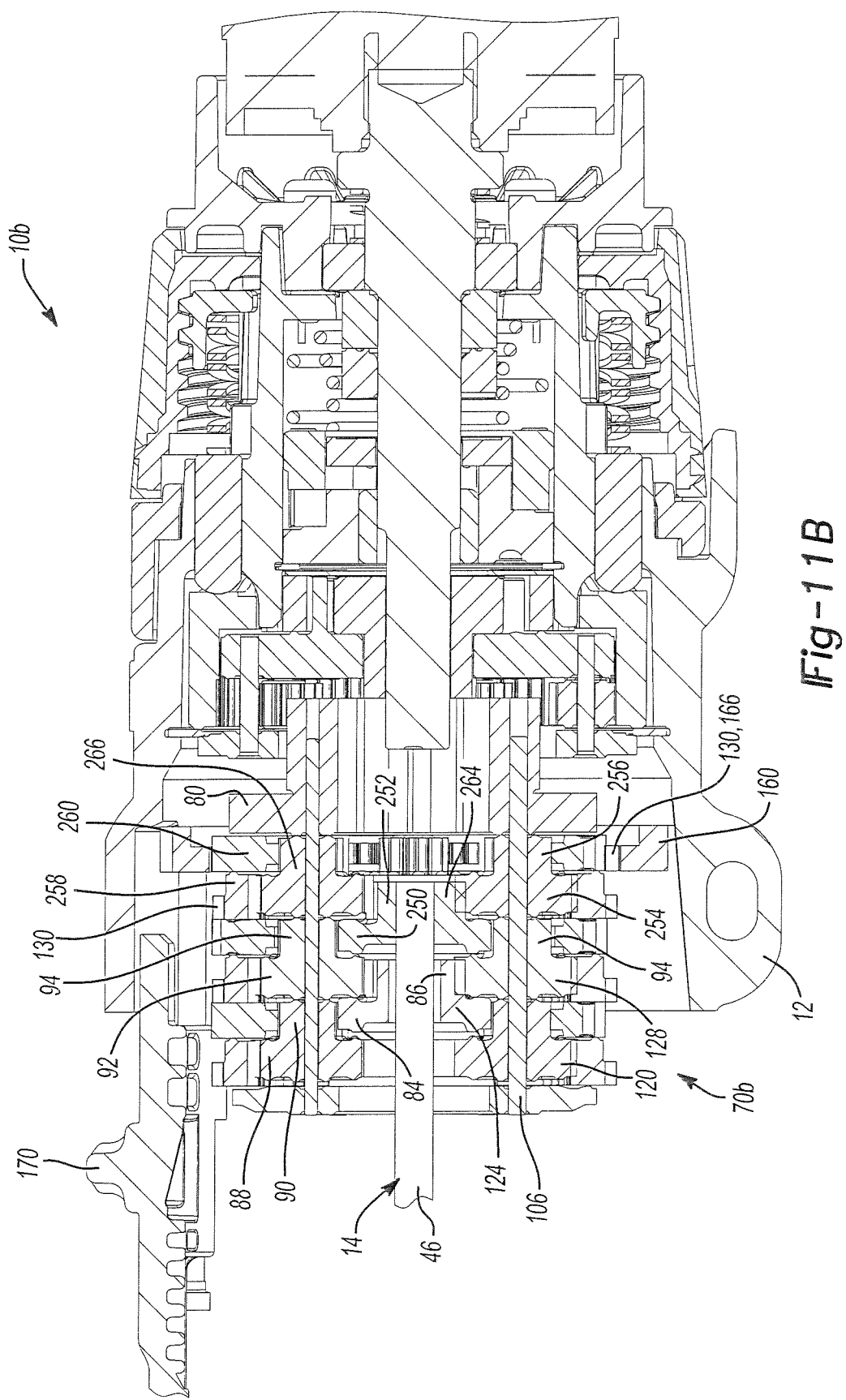
FIG. 11B is a longitudinal section view of a portion of still another exemplary tool constructed in accordance with the teachings of the present disclosure.

The examples of FIGS. 11A and 11B are generally similar to the example of FIG. 11 except that the first sun gear 82 (FIG. 11) has been omitted and that either the first compound sun gear 124 or the second compound sun gear 264 is coupled to the output shaft 46 for rotation therewith as shown in FIGS. 11A and 11B, respectively.

With regard to the example of FIG. 11A, the speed selector switch 170 can be positioned in the sixth switch position, which positions the movable member 160 in engagement with the ring gear 260 such that the ring gear 260 is nonrotatably coupled to the housing assembly 12. Rotary power output from the motor assembly 14 is transmitted from the output shaft 46 to the first compound sun gear 124. Rotation of the first compound sun gear 124 causes corresponding rotation of the planet gears 92 due to the meshing engagement of the teeth of the planet gears 92 with the teeth of the sun gear 86. As the planet gears 92 are coupled to the planet gears 94 for common rotation and as the teeth of the planet gears 92 are meshingly engaged to the teeth of the sun gear 250, rotation of the planet gears 92 causes corresponding rotation of the sun gear 250. It will be appreciated that since the pitch diameter of the planet gears 92 is smaller than the pitch diameter of the planet gears 92, and since the pitch diameter of the sun gear 250 is larger than the pitch diameter of the sun gear 86, the second compound planet gear 128 cooperates to produce a first intermediate gear reduction within the first gearset portion 70b. Since the sun gear 252 is coupled to the sun gear for common rotation, and since the teeth of the planet gears 254 are meshed with the teeth of the sun gear 252, rotation of the sun gear 250 causes corresponding rotation of the planet gears 254. It will be appreciated that since the pitch diameter of the sun gear 252 is smaller than the pitch diameter of the sun gear 250, and since the pitch diameter of the planet gears 254 is larger than the pitch diameter of the planet gears 92, the second compound sun gear 264 cooperates to produce a second intermediate gear reduction within the first gearset portion 70b. Because the planet gears 256 are coupled to the planet gears 254 for common rotation, the planet gears 256 will drive the planet carrier 80 such that the first gearset portion 70b operates in sixth overall speed reduction ratio.

Positioning of the speed selector switch 170 in the fifth switch position positions the movable member 160 in engagement with the ring gear 258 such that the ring gear 258 is nonrotatably coupled to the housing assembly 12. Rotary power output from the motor assembly 14 is transmitted from the output shaft 46 to the first compound sun gear 124. Rotation of the first compound sun gear 124 causes corresponding rotation of the planet gears 92 due to the meshing engagement of the teeth of the planet gears 92 with the teeth of the sun gear 86. As the planet gears 92 are coupled to the planet gears 94 for common rotation and as the teeth of the planet gears 92 are meshingly engaged to the teeth of the sun gear 250, rotation of the planet gears 92 causes corresponding rotation of the sun gear 250. It will be appreciated that since the pitch diameter of the planet gears 92 is smaller than the pitch diameter of the planet gears 92, and since the pitch diameter of the sun gear 250 is larger than the pitch diameter of the sun gear 86, the second compound planet gear 128 cooperates to produce a first intermediate gear reduction within the first gearset portion 70b. Since the sun gear 252 is coupled to the sun gear for common rotation, and since the teeth of the planet gears 254 are meshed with the teeth of the sun gear 252, rotation of the sun gear 250 causes corresponding rotation of the planet gears 254. Rotation of the planet gears 254 drives the planet carrier 80 such that the first gearset portion 70b operates in fifth overall speed reduction ratio.

Positioning of the speed selector switch 170 in a fourth switch position positions the movable member 160 in engagement with the ring gear 100 such that the ring gear 100 is nonrotatably coupled to the housing assembly 12. Rotary power output from the motor assembly 14 is transmitted from the output shaft 46 to the first compound sun gear 124. Rotation of the first compound sun gear 124 causes corresponding rotation of the planet gears 92 due to the meshing engagement of the teeth of the planet gears 92 with the teeth of the sun gear 86. As the planet gears 92 are coupled to the planet gears 94, the planet gears 94 drive the planet carrier 80 such that the first gearset portion 70b operates in a fourth overall speed reduction ratio.

Positioning of the speed selector switch 170 in a third switch position positions the movable member 160 in engagement with the ring gear 200 such that the ring gear 200 is nonrotatably coupled to the housing assembly 12. Rotary power output from the motor assembly 14 is transmitted from the output shaft 46 to the first compound sun gear 124. Rotation of the first compound sun gear 124 causes corresponding rotation of the planet gears 92 due to the meshing engagement of the teeth of the planet gears 92 with the teeth of the sun gear 86. The planet gears 92 drive the planet carrier 80 such that the first gearset portion 70b operates in a third overall speed reduction ratio.

Positioning of the speed selector switch 170 in the second switch position positions the movable member 160 in engagement with the ring gear 98 such that the ring gear 98 is nonrotatably coupled to the housing assembly 12. Rotary power output from the motor assembly 14 is transmitted from the output shaft 46 to the first compound sun gear 124. Rotation of the first compound sun gear 124 causes corresponding rotation of the planet gears 90 due to the meshing engagement of the teeth of the planet gears 90 with the teeth of the sun gear 84. The planet gears 90 drive the planet carrier 80 such that the first gearset portion 70b operates in a second overall speed reduction ratio.

Positioning of the speed selector switch 170 in the first switch position positions the movable member 160 in engagement with the ring gear 96 (as shown in FIG. 17) such that the ring gear 96 is nonrotatably coupled to the housing assembly 12. Rotation of the first compound sun gear 124 causes corresponding rotation of the planet gears 90 due to the meshing engagement of the teeth of the planet gears 90 with the teeth of the sun gear 84. As the planet gears 88 are coupled to the planet gears 90 for rotation therewith, the planet gears 88 drive the planet carrier 80 such that the first gearset portion 70b operates in a first overall speed reduction ratio.

With regard to the example of FIG. 11B, the speed selector switch 170 can be positioned in the sixth switch position, which positions the movable member 160 in engagement with the ring gear 260 such that the ring gear 260 is nonrotatably coupled to the housing assembly 12. Rotary power output from the motor assembly 14 is transmitted from the output shaft 46 to the second compound sun gear 264. Rotation of the second compound sun gear 264 causes corresponding rotation of the planet gears 254 due to the meshing engagement of the teeth of the planet gears 254 with the teeth of the sun gear 252. As the planet gears 254 are coupled to the planet gears 256 for common rotation and as the teeth of the planet gears 254 are meshingly engaged to the teeth of the sun gear 252, the planet gears 256 will drive the planet carrier 80 such that the first gearset portion 70b operates in sixth overall speed reduction ratio.

Positioning of the speed selector switch 170 in the fifth switch position positions the movable member 160 in engagement with the ring gear 258 such that the ring gear 258 is nonrotatably coupled to the housing assembly 12. Rotary power output from the motor assembly 14 is transmitted from the output shaft 46 to the second compound sun gear 264. Rotation of the second compound sun gear 264 causes corresponding rotation of the planet gears 254 due to the meshing engagement of the teeth of the planet gears 254 with the teeth of the sun gear 252. Rotation of the planet gears 254 drives the planet carrier 80 such that the first gearset portion 70b operates in fifth overall speed reduction ratio.

Positioning of the speed selector switch 170 in a fourth switch position positions the movable member 160 in engagement with the ring gear 100 such that the ring gear 100 is nonrotatably coupled to the housing assembly 12. Rotary power output from the motor assembly 14 is transmitted from the output shaft 46 to the second compound sun gear 264. Rotation of the second compound sun gear 264 causes corresponding rotation of the planet gears 94 due to the meshing engagement of the teeth of the planet gears 94 with the teeth of the sun gear 250. Rotation of the planet gears 94 drives the planet carrier 80 such that the first gearset portion 70b operates in fourth overall speed reduction ratio.

Positioning of the speed selector switch 170 in a third switch position positions the movable member 160 in engagement with the ring gear 200 such that the ring gear 200 is nonrotatably coupled to the housing assembly 12. Rotary power output from the motor assembly 14 is transmitted from the output shaft 46 to the second compound sun gear 264. Rotation of the second compound sun gear 264 causes corresponding rotation of the planet gears 94 due to the meshing engagement of the teeth of the planet gears 94 with the teeth of the sun gear 250. Since the planet gears 92 are coupled for rotation with the planet gears 94 for common rotation, the planet gears 92 drive the planet carrier 80 such that the first gearset portion 70b operates in a third overall speed reduction ratio.

Positioning of the speed selector switch 170 in the second switch position positions the movable member 160 in engagement with the ring gear 98 such that the ring gear 98 is nonrotatably coupled to the housing assembly 12. Rotary power output from the motor assembly 14 is transmitted from the output shaft 46 to the second compound sun gear 264. Rotation of the second compound sun gear 264 causes corresponding rotation of the planet gears 94 due to the meshing engagement of the teeth of the planet gears 94 with the teeth of the sun gear 250. Since the planet gears 92 are coupled for rotation with the planet gears 94 for common rotation, the planet gears 92 drive sun gear 86. Since the sun gear 84 is coupled for rotation with the sun gear 86, rotation of the sun gear 86 causes corresponding rotation of the planet gears 90 (due to meshing engagement between the planet gears 90 and the sun gear 84). Rotation of the planet gears 90 drives the planet carrier 80 such that the first gearset portion 70b operates in a second overall speed reduction ratio.

Positioning of the speed selector switch 170 in the first switch position positions the movable member 160 in engagement with the ring gear 96 (as shown in FIG. 17) such that the ring gear 96 is nonrotatably coupled to the housing assembly 12. Rotary power output from the motor assembly 14 is transmitted from the output shaft 46 to the second compound sun gear 264. Rotation of the second compound sun gear 264 causes corresponding rotation of the planet gears 94 due to the meshing engagement of the teeth of the planet gears 94 with the teeth of the sun gear 250. Since the planet gears 92 are coupled for rotation with the planet gears 94 for common rotation, the planet gears 92 drive sun gear 86. Since the sun gear 84 is coupled for rotation with the sun gear 86, rotation of the sun gear 86 causes corresponding rotation of the planet gears 90 (due to meshing engagement between the planet gears 90 and the sun gear 84). As the planet gears 88 are coupled to the planet gears 90 for rotation therewith, rotation of the planet gears drives the planet gears 88, which drive the planet carrier 80 such that the first gearset portion 70b operates in a first overall speed reduction ratio.

Figure 18:
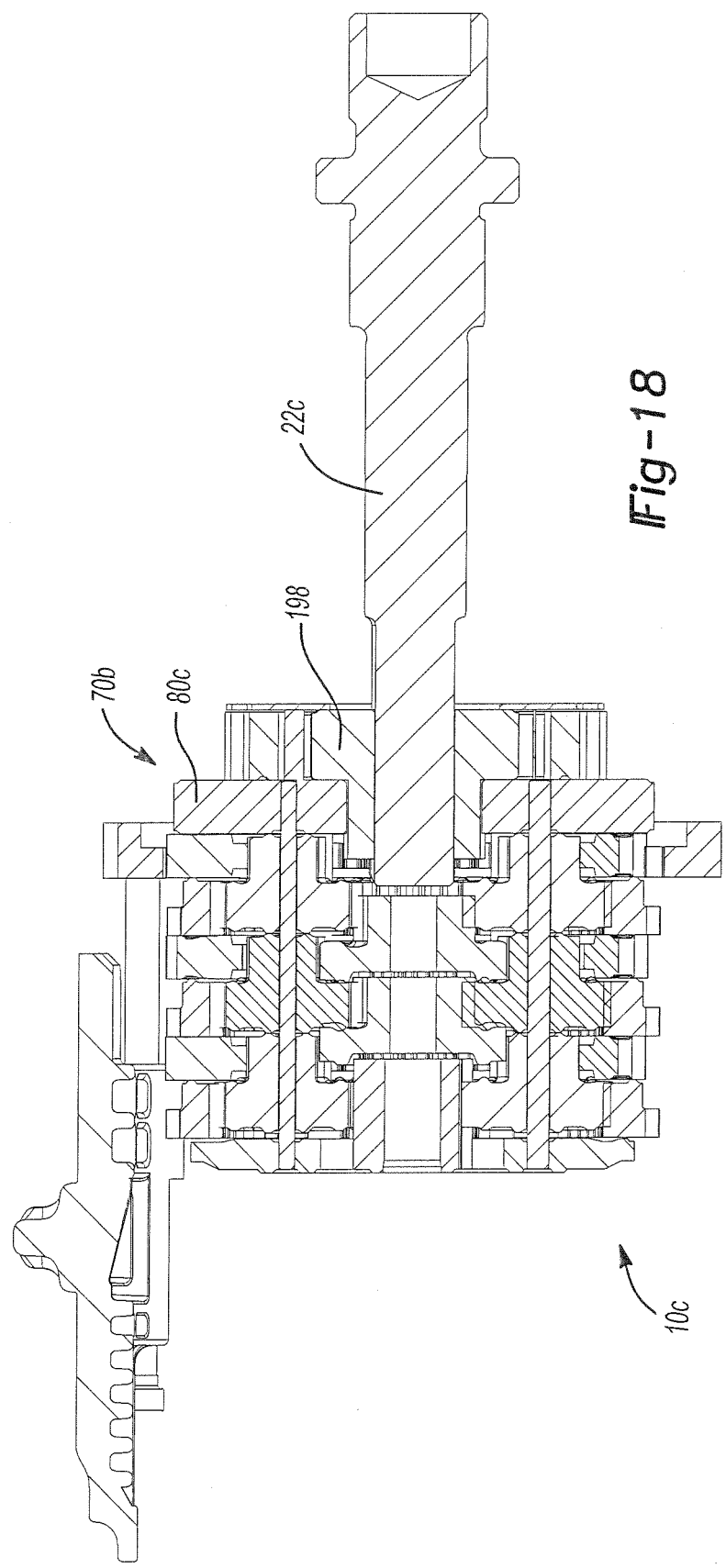
FIG. 18 is a longitudinal section view of a portion of another exemplary tool constructed in accordance with the teachings of the present disclosure.

In FIG. 18, another tool constructed in accordance with the teachings of the present disclosure is generally indicated by reference numeral 10c. The tool 10c is generally similar to the tool 10b of FIG. 11, except that the first gearset portion 70b is configured to output rotary power directly to the output spindle 22c. In this regard, the planet carrier 80c is modified to work directly with the spindle lock assembly 198 to transmit rotary power to the output spindle 22c.

Figure 19:
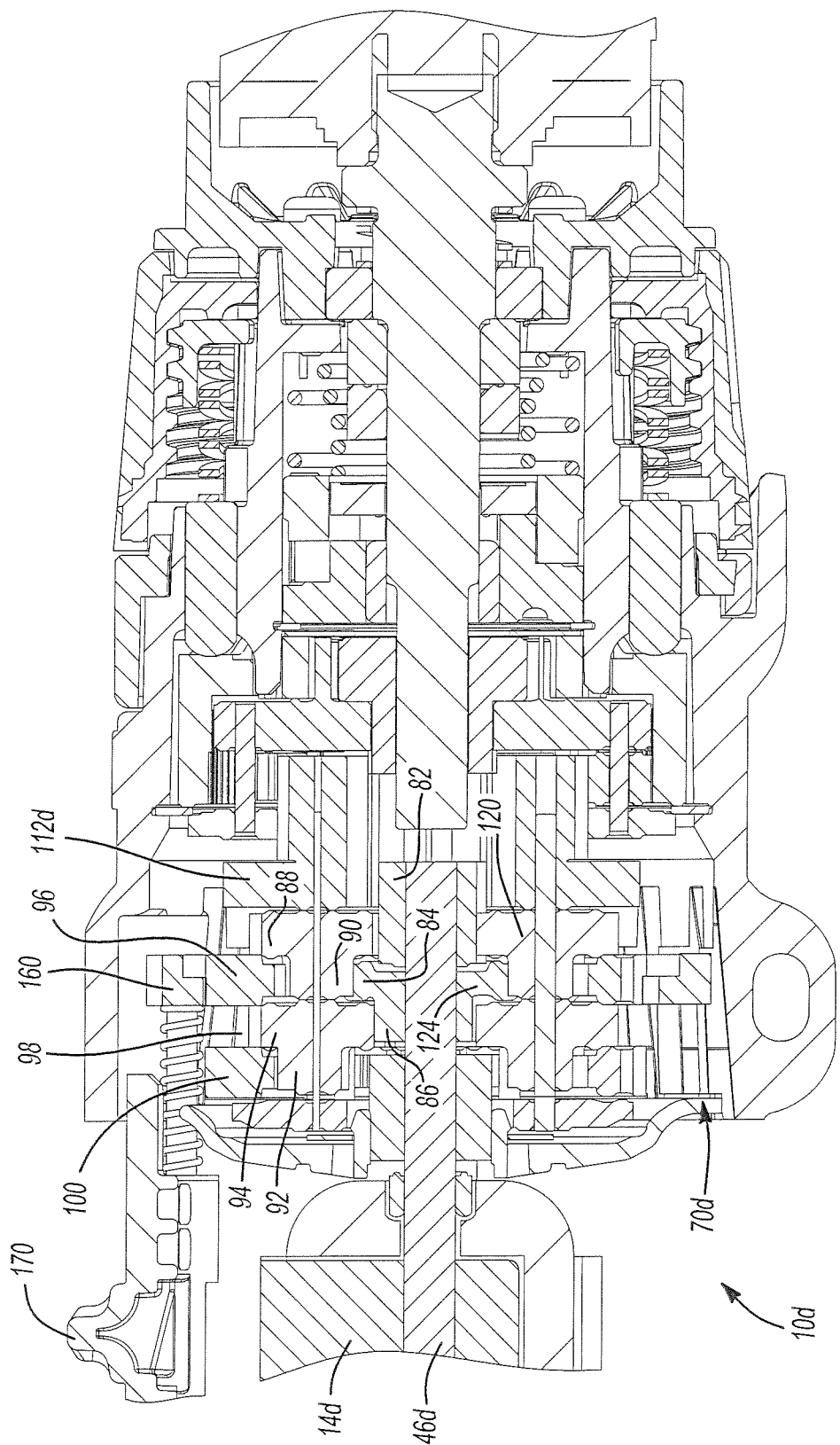
FIG. 19 is a longitudinal section view of a portion of another exemplary tool constructed in accordance with the teachings of the present disclosure.

In FIG. 19, a further tool constructed in accordance with the teachings of the present disclosure is generally indicated by reference numeral 10d. The tool 10d is generally similar to the tool 10a of FIG. 7, except for the configuration of the first gearset portion and the speed selector switch. More specifically, the first gearset portion 70d is configured such that the first or input sun gear 82 is positioned proximate the front plate member 112d, the ring gear meshed with the first planet gears 88 has been omitted, and the speed selector switch 170 is selectively positionable in first, second and third switch positions.

Figure 20:
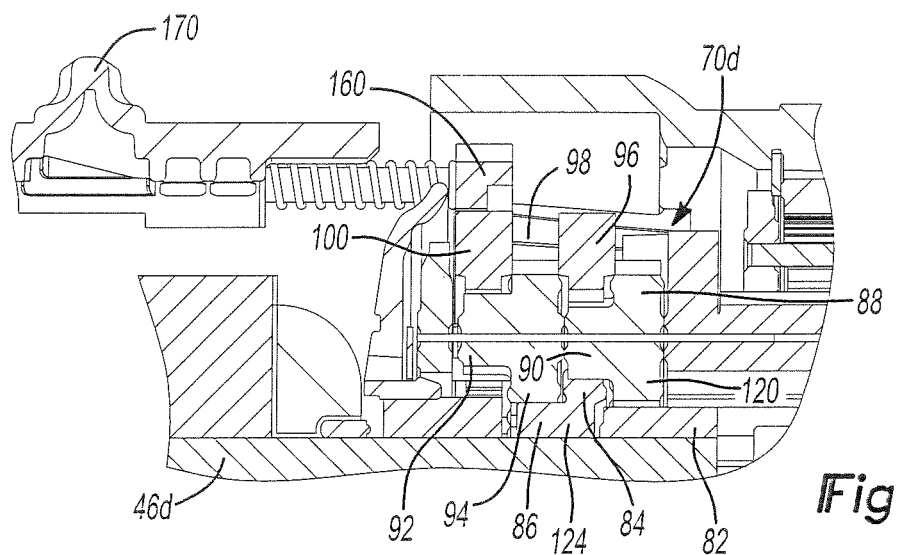
FIGS. 20, 21 and 22 are longitudinal section views of a portion of the tool of FIG. 19, depicting a gearset portion of the tool as operating in first, second and third modes, respectively.

Positioning of the speed selector switch 170 in the third switch position (shown in FIG. 20) positions the movable member 160 in engagement with the third ring gear 100 (closest to the motor assembly 14d in this example) such that the third ring gear 100 is nonrotatably coupled to the housing assembly 12. Rotary power output from the motor assembly 14d is transmitted from the output shaft 46d to the input sun gear 82. Rotation of the input sun gear 82 causes corresponding rotation of the first planet gears 88 due to the meshing engagement of the teeth of the first planet gears 88 with the teeth of the input sun gear 82. As the second planet gears 90 are coupled to the first planet gears 88 for common rotation and as the teeth of the second planet gears 90 are meshingly engaged to the teeth of the second sun gear 84, rotation of the second planet gears 90 causes corresponding rotation of the second sun gear 84. It will be appreciated that since the pitch diameter of the second planet gears 90 is smaller than the pitch diameter of the first planet gears 88, and since the pitch diameter of the second sun gear 84 is larger than the pitch diameter of the first sun gear 82, the first compound planet gear 120 cooperates to produce a first intermediate gear reduction within the first gearset portion 70d. Since the third sun gear 86 is coupled to the second sun gear for common rotation, and since the teeth of the fourth planet gears 94 are meshed with the teeth of the third sun gear 86, rotation of the second sun gear 84 causes corresponding rotation of the fourth planet gears 94. It will be appreciated that since the pitch diameter of the third sun gear 86 is smaller than the pitch diameter of the second sun gear 84, and since the pitch diameter of the fourth planet gears 94 is larger than the pitch diameter of the second planet gears 90, the first compound sun gear 124 cooperates to produce a second intermediate gear reduction within the first gearset portion 70d. It will be further appreciated that because the third planet gears 92 are coupled to the fourth planet gears 94 for common rotation, the third planet gears 92 will drive the planet carrier 80 such that the first gearset portion 70d operates in a third overall speed reduction ratio.

Figure 21:
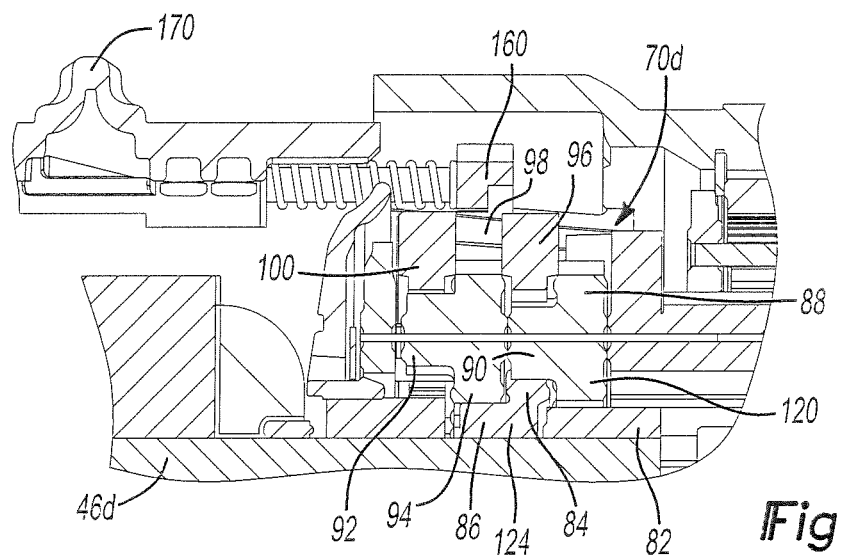

Positioning of the speed selector switch 170 in the second switch position (shown in FIG. 21) positions the movable member 160 in engagement with the second ring gear 98 such that the second ring gear 98 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88 due to the meshing engagement of the teeth of the first planet gears 88 with the teeth of the input sun gear 82. As the second planet gears 90 are coupled to the first planet gears 88 for common rotation and as the teeth of the second planet gears 90 are meshingly engaged to the teeth of the second sun gear 84, rotation of the second planet gears 90 causes corresponding rotation of the second sun gear 84. It will be appreciated that since the pitch diameter of the second planet gears 90 is smaller than the pitch diameter of the first planet gears 88, and since the pitch diameter of the second sun gear 84 is larger than the pitch diameter of the first sun gear 82, the first compound planet gear 120 cooperates to produce a first intermediate gear reduction within the first gearset portion 70*d*. Since the third sun gear 86 is coupled to the second sun gear for common rotation, and since the teeth of the fourth planet gears 94 are meshed with the teeth of the third sun gear 86, rotation of the second sun gear 84 causes corresponding rotation of the fourth planet gears 94. It will be appreciated that since the pitch diameter of the third sun gear 86 is smaller than the pitch diameter of the second sun gear 84, and since the pitch diameter of the fourth planet gears 94 is larger than the pitch diameter of the second planet gears 90, the first compound sun gear 124 cooperates to produce a second intermediate gear reduction within the first gearset portion 70*d*. The fourth planet gears 94 will drive the planet carrier 80 such that the first gearset portion 70*d* operates in a second overall speed reduction ratio that is intermediate the first and third overall speed reduction ratios.

Figure 22:
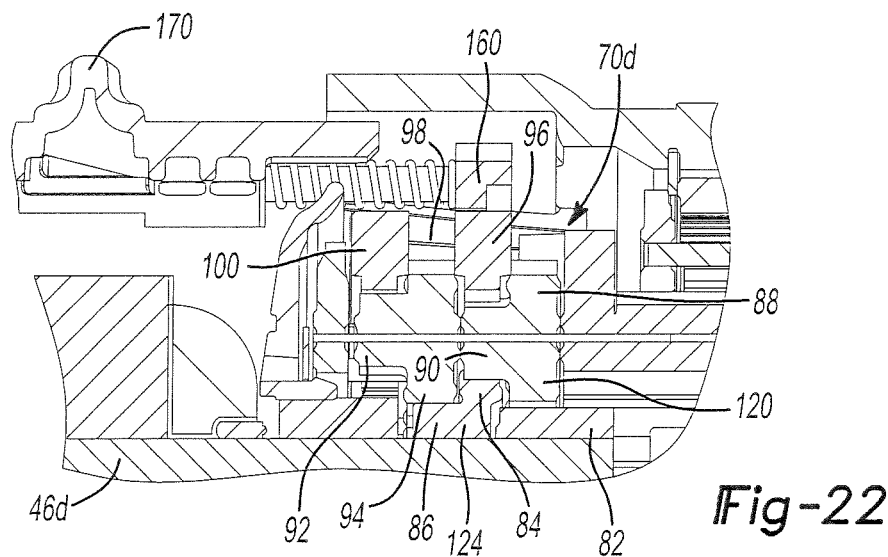

Positioning of the speed selector switch 170 in the first switch position (shown in FIG. 22) positions the movable member 160 in engagement with the first ring gear 96 such that the first ring gear 96 is nonrotatably coupled to the housing assembly 12. Rotary power output from the motor assembly 14 is transmitted from the output shaft 46 to the input sun gear 82. Rotation of the input sun gear 82 causes corresponding rotation of the first planet gears 88 due to the meshing engagement of the teeth of the first planet gears 88 with the teeth of the input sun gear 82. The second planet gears 90 will drive the planet carrier 80 such that the first gearset portion 70*d* operates in a first overall speed reduction ratio.

With reference to FIG. 23, another tool constructed in accordance with the teachings of the present disclosure is generally indicated by reference numeral 10*e*. The tool 10*e* is generally similar to the tool 10*d* of FIG. 19, except that the second ring gear 98 has been omitted. Accordingly, the tool 10*e* has a first gearset portion 70*e* that is selectively operable in two overall speed reduction ratios.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A power tool comprising:
   a housing;
   a motor received in the housing;
   an output spindle; and
   a transmission transmitting rotary power from the motor to the output spindle, the transmission comprising a planetary gearset having an input sun gear rotationally driven by the motor, at least one ring gear, an output planet carrier, and a first stage planet gear, a second stage planet gear, and a third stage planet gear each mounted for rotation on the planet carrier,
   wherein the planetary gearset is operable in a first mode in which the planetary gearset provides a first overall gear reduction from the input sun gear to the output planet carrier, and in a second mode in which the planetary gearset provides a second, lower overall gear reduction ratio from the input sun gear to the output planet carrier with the planet gears providing at least one intermediate gear reduction ratio within the planetary gearset.

2. The power tool of claim 1, wherein the at least one ring gear comprises a first ring gear meshed with one of planet gears and a second ring gear meshed with another one of planet gears.

3. The power tool of claim 1, further comprising a speed selector that is movable between a first position where the planetary gearset operates in the first mode and a second position where the planetary gearset operates in the second mode.

4. The power tool of claim 1, wherein at least two of the planetary gears are fixed to each other to form a compound planetary gear.

5. The power tool of claim 1, wherein at least two of the planetary gears have a different pitch diameter.

6. The power tool of claim 1, wherein the input sun gear is meshed with the first stage planet gear, and further comprising an intermediate gear coupling the second stage planet gear and the third stage planet gear.

7. The power tool of claim 6, wherein the intermediate gear comprises a compound sun gear meshed with the second stage planet gear and with the third stage planet gear.

8. The power tool of claim 1, wherein the planetary gearset is operable in a third mode in which the planetary gearset provides a third overall gear reduction from the input sun gear to the output planet carrier with the planet gears providing at least two intermediate gear reduction ratios within the planetary gearset, the third overall gear reduction ratio being lower than the second overall gear reduction ratio.

9. The power tool of claim 1, further comprising a fourth stage planet gear also mounted for rotation on the output carrier.

10. The power tool of claim 9, wherein the first and second stage planet gears are fixed to each other to form a first compound planet gear, and the third and fourth stage planet gears are fixed to each other to form a second compound planet gear.

11. The power tool of claim 9, wherein the planetary gearset is operable in a third mode in which the planetary gearset provides a third overall gear reduction ratio from the input sun gear to the output planet carrier with the planet gears providing at least two intermediate gear reduction ratios within the planetary gearset, the third overall gear reduction ratio being lower than the second overall gear reduction ratio.

12. The power tool of claim 11, wherein the planetary gearset is operable in a fourth mode in which the planetary gearset provides a fourth gear reduction ratio from the input sun gear to the output planet carrier with the planet gears providing at least two intermediate gear reduction ratios within the planetary gearset, the fourth overall gear reduction ratio being lower than the third overall gear reduction ratio.

13. The power tool of claim 1, wherein the first stage planet gear, the second stage planet gear, and the third stage planet gear are mounted non-sequentially to the output carrier.

14. A transmission for transmitting rotary power in a power tool, the transmission comprising:
a planetary gearset having an input sun gear rotationally driven by the motor, at least one ring gear, an output planet carrier, a first compound planet gear having a first stage planet gear fixed to a second stage planet gear, and a second compound planet gear having a third stage planet gear fixed to a fourth stage planet gear, each of the first and second compound planet gears mounted for rotation on the planet carrier,
wherein the planetary gearset is operable in a first mode in which the planetary gearset provides a first overall gear reduction from the input sun gear to the output planet carrier, and in a second mode in which the planetary gearset provides a second, lower overall gear reduction ratio from the input sun gear to the output planet carrier with the planet gears providing at least one intermediate gear reduction ratio within the planetary gearset.

15. The transmission of claim 14, wherein the at least one ring gear comprises at a first ring gear meshed with one of the compound planet gears and a second ring gear meshed with the second compound planet gear.

16. The transmission of claim 14, further comprising a speed selector that is movable between a first position where the planetary gearset operates in the first mode and a second position where the planetary gearset operates in the second mode.

17. The transmission of claim 14, further comprising an intermediate gear coupling the first compound planet gear to the second compound planet gear.

18. The transmission of claim 17, wherein the intermediate gear comprises a compound sun gear meshed with the one of the planet gears of the first compound planet gear and one of the planet gears of the second compound planet gear.

19. The transmission of claim 14, wherein the planetary gearset is operable in a third mode in which the planetary gearset provides a third overall gear reduction ratio from the input sun gear to the output planet carrier with the planet gears providing at least two intermediate gear reduction ratios within the planetary gearset, the third overall gear reduction ratio being lower than the second overall gear reduction ratio.

20. The transmission of claim 14, wherein the first stage planet gear, the second stage planet gear, the third stage planet gear, and the fourth stage planet gear are mounted non-sequentially to the output carrier.

* * * * *